US012596836B2

(12) United States Patent　　　　(10) Patent No.: US 12,596,836 B2
Lifshotz et al.　　　　　　　　　　　(45) Date of Patent:　　　Apr. 7, 2026

(54) COMPLIANCE DATA STANDARDIZATION AND AUDIT OUTPUT

(71) Applicant: Hatch Compliance Inc., Charlotte, NC (US)

(72) Inventors: Michael Lifshotz, Charlotte, NC (US); Renee Douthat, Charlotte, NC (US); Christopher Rivera, Miami, FL (US)

(73) Assignee: Hatch Compliance Inc., Charlotte, NC (US)

( * ) Notice: Subject to any disclaimer, the term of this patent is extended or adjusted under 35 U.S.C. 154(b) by 331 days.

(21) Appl. No.: 18/313,927

(22) Filed: May 8, 2023

(65) Prior Publication Data

US 2024/0378312 A1　　Nov. 14, 2024

(51) Int. Cl.
G06F 21/62　　　　(2013.01)
(52) U.S. Cl.
CPC ................................. G06F 21/6245 (2013.01)
(58) Field of Classification Search
CPC .................................................... G06F 21/6245
See application file for complete search history.

(56) References Cited

U.S. PATENT DOCUMENTS

| | | | |
|---|---|---|---|
| 9,049,314 B2 | 6/2015 | Pugh et al. | |
| 10,929,983 B2 | 2/2021 | Hanina et al. | |
| 2019/0057765 A1* | 2/2019 | Mayer | G16H 40/67 |
| 2020/0273046 A1* | 8/2020 | Biswas | G06N 3/08 |
| 2021/0012254 A1* | 1/2021 | Campbell | G06Q 30/0185 |
| 2021/0035116 A1* | 2/2021 | Berrington | G06N 5/04 |
| 2021/0383292 A1* | 12/2021 | Samples | G16H 40/20 |

* cited by examiner

*Primary Examiner* — Esther B. Henderson
(74) *Attorney, Agent, or Firm* — Polygon IP, LLP

(57)　　　　　　ABSTRACT

Described herein is a compliance dataflow management system. The system may include a plurality of different databases. The system may be configured to provide for workflow that are in conformance of regulations and/or requirements for specific jurisdictions. Furthermore, aspects of the system may allow for automatic updating of compliance systems in a manner that allows for resource savings for automated compliance software. Additionally, the system may include automated auditing systems, allowing for a compliance rating to be determined in a quick and resource efficient manner while allowing for privacy and security to be maintained.

20 Claims, 17 Drawing Sheets

600D

650 Provide First Form Version

652 Receive First User Entry

654 Provide Updated Form Version

700B

740

Receive Jurisdiction Data

742

Analyze Jurisdiction Data

744

Determine Action Milestones

746

Determine Actions Required

748

Provide Data for Meeting Milestones

700C

COMPLIANCE DATA STANDARDIZATION AND AUDIT OUTPUT

BACKGROUND

Regulatory compliance is critical for organizations that are operating within the healthcare space, as well as in other fields. Typically, regulatory compliance is manually performed, with a compliance officer of an organization manually determining the forms and information that are needed to be compliant for any single matter of an organization. Auditing for regulatory compliance is also performed manually, with individual human auditors utilizing their own judgment to determine whether an organization is within compliance. Such techniques require large amounts of manpower and are also susceptible to human error, as regulations may regularly change. In certain situations, the compliance officer or auditor may forget about changes or even be unaware of such changes, leading to error and non-compliance.

SUMMARY

Described are methods and systems for determination of a compliance rating for an entity. In a certain embodiment, a system may be disclosed. The system comprising a jurisdiction database, an audit database, a communication module, and a controller, communicatively coupled to the jurisdiction database, the audit database, and the communication module. The controller may be configured to perform operations comprising receiving, via the communication module, compliance data associated with a first audit from a first user device, the compliance data including geographical data, determining, from the geographical data, a first jurisdiction associated with the first audit, obtaining jurisdiction requirement data associated with the first jurisdiction from the jurisdiction database, determining, from the jurisdiction requirement data, audit requirements of the first audit, determining, from the jurisdiction requirement data and the compliance data, a remaining audit period, determining a compliance rating based on the compliance data, the audit requirements, and the remaining audit period, and outputting the compliance rating.

In a certain embodiment, the operations further comprise obtaining first user historical data from the audit database, wherein the compliance rating is further determined based on the first user historical data. In a certain embodiment, the operations further comprise determining, based on the first user historical data, a historical compliance pattern. In a certain embodiment, the operations further comprise determining a difference between the compliance data and the historical compliance pattern.

In a certain embodiment, the compliance rating is configured to indicate a likelihood of compliance by the end of the remaining audit period. In a certain embodiment, the operations further comprise determining that the compliance rating is below a threshold compliance rating, wherein the outputting the compliance rating is based on the determining that the compliance rating is below the threshold compliance rating. In a certain embodiment, the operations further comprise determining suggested compliance actions and outputting the suggested compliance actions to the first user device.

In a certain embodiment, the compliance data comprises action data, wherein the action data indicates one or more compliance actions and an associated time of action for each of the compliance actions, and wherein the compliance rating is determined based on the action data.

In a certain embodiment, the compliance rating is output to the first user device.

In a certain embodiment, the compliance rating is output to a third party auditor.

In another embodiment, a method may be disclosed. The method may include receiving, via a communication module, compliance data associated with a first audit from a first user device, the compliance data including geographical data, determining, from the geographical data, a first jurisdiction associated with the first audit, obtaining jurisdiction requirement data associated with the first jurisdiction from a jurisdiction database, determining, from the jurisdiction requirement data, audit requirements of the first audit, determining, from the jurisdiction requirement data and the compliance data, a remaining audit period, determining a compliance rating based on the compliance data, the audit requirements, and the remaining audit period, and outputting the compliance rating.

In a certain embodiment, the method further comprises obtaining first user historical data from an audit database, wherein the compliance rating is further determined based on the first user historical data. In a certain embodiment, the method further comprises determining, based on the first user historical data, a historical compliance pattern. In a certain embodiment, the method further comprises determining a difference between the compliance data and the historical compliance pattern.

In a certain embodiment, the compliance rating is configured to indicate a likelihood of compliance by the end of the remaining audit period. In a certain embodiment, the method further comprises determining that the compliance rating is below a threshold compliance rating, wherein the outputting the compliance rating is based on the determining that the compliance rating is below the threshold compliance rating. In a certain embodiment, the method further comprises determining suggested compliance actions and outputting the suggested compliance actions to the first user device.

In a certain embodiment, the compliance data comprises action data, wherein the action data indicates one or more compliance actions and an associated time of action for each of the compliance actions, and wherein the compliance rating is determined based on the action data.

In a certain embodiment, the compliance rating is output to the first user device.

In a certain embodiment, the compliance rating is output to a third party auditor.

Illustrative, non-exclusive examples of inventive features according to the present disclosure are described herein. These and other examples are described further below with reference to figures.

BRIEF DESCRIPTION OF THE DRAWINGS

The disclosure may best be understood by reference to the following description taken in conjunction with the accompanying drawings, which illustrate various embodiments.

DETAILED DESCRIPTION

Figure 1:
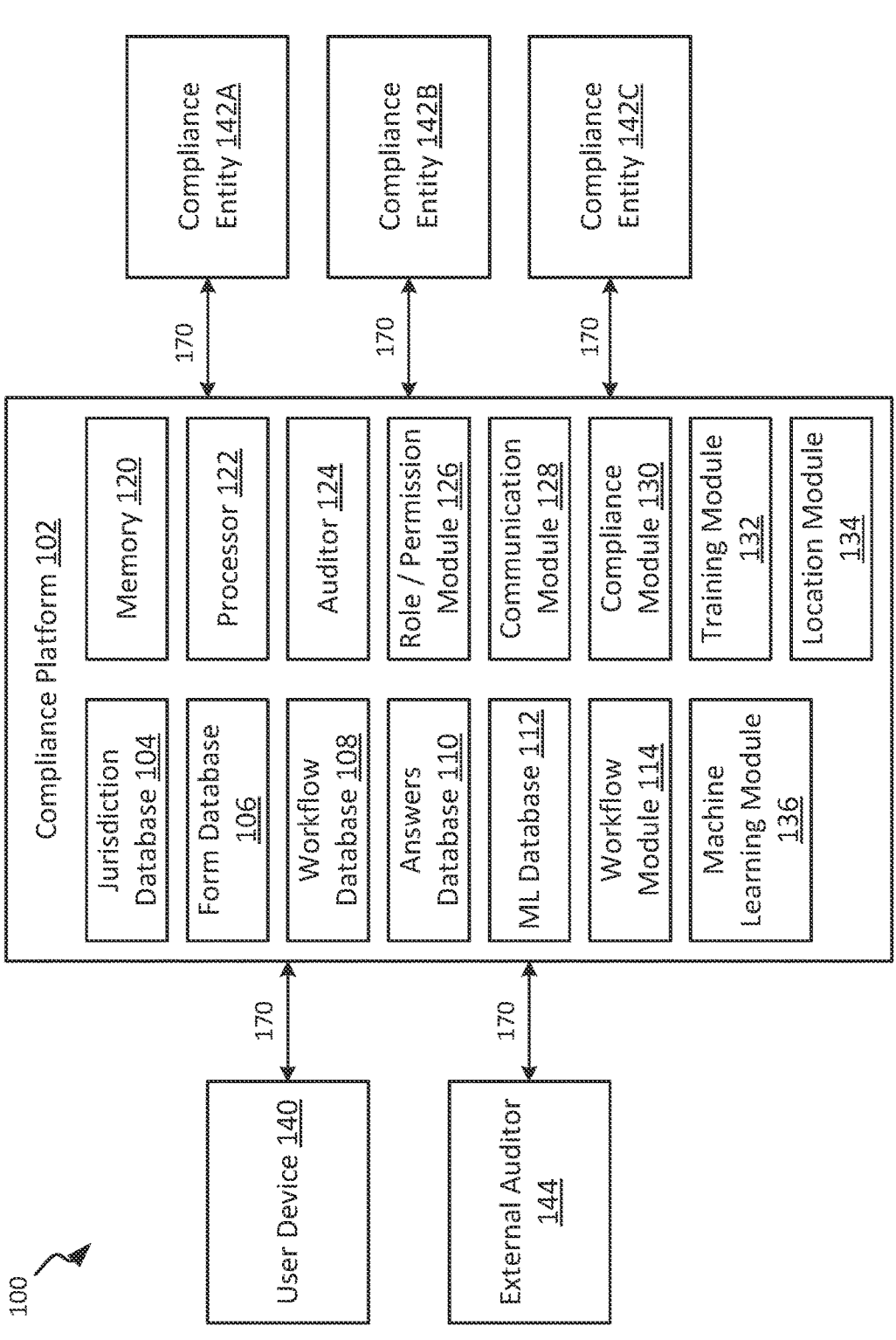
FIG. 1 illustrates a block diagram of an example system for compliance dataflow management, in accordance with some embodiments.

In the following description, specific details are set forth to provide illustrative examples of the systems and techniques described herein. The presented concepts may be practiced without some, or all, of these specific details. In other instances, well known process operations have not been described in detail to avoid unnecessarily obscuring the described concepts. While some concepts will be described with the specific examples, it will be understood that these examples are not intended to be limiting.

Some implementations of the disclosed systems, apparatus, methods and computer program products are configured for implementing a compliance dataflow management system (e.g., for compliance with healthcare regulations and/or procedures, such as for compliance with healthcare laws, for compliance with human resources procedures, such as laws related to human resources and/or for internal human resources procedures, and/or for compliance with requirements of industry standards, accrediting agencies, or with insurance regulations). Various aspects of the system may be configured to manage data in an environment where privacy and security are paramount.

Furthermore, aspects of the system may allow for automatic updating of compliance systems in a manner that allows for resource savings for automated compliance software. Such automatic updating may include updating systems so that subsequent data (e.g., forms) provided by the system are fully up to date and, thus, do not require the correction of incorrect forms. Correction of incorrect forms stored on servers require significant network and memory resources; automatic updating may allow for conservation of such resources. Additionally, aspects of the system may further include automated auditing systems, allowing for compliance to be determined in a quick and resource efficient manner while allowing for privacy and security to be maintained. Furthermore, the system may include various Application Programming Interfaces (APIs), and aspects of the system may be utilized through the various APIs.

Various auditing systems and techniques described herein may automatically determine audit status and/or ratings for users of the systems. Such auditing systems and techniques may utilize data stored within databases and/or received from users of the system and, thus, output a plurality of different compliance ratings. Such ratings may include, for example, a rating for the organization's compliance status at the current moment and a rating for the organization's compliance risk based on stored data.

The auditing systems and techniques may also determine the timeframes of auditing tasks performed and/or the time remaining for the tasks to be performed during the current audit period. The status and/or ratings may be accordingly determined based on such time aspects of the audit. Other aspects of auditing may also be provided by the systems and techniques, according to examples described herein.

In various embodiments, the disclosed systems and techniques may be used for compliance with various industry and/or private party regulations and/or requirements. Though reference may be made to compliance with certain industries (e.g., the healthcare industry, such as the behavioral healthcare industry), it is appreciated that the system and techniques described herein may be applicable to any industry and/or application where compliance with certain requirements is needed. The auditing systems described herein allow for a system that provides all-in-one compliance, eliminating the need for disparate compliance software, compliance officers, compliance experts specialized in different jurisdictions, and other such disparate compliance systems and personnel.

FIG. 1 illustrates a block diagram of an example system for compliance dataflow management, in accordance with some embodiments. FIG. 1 illustrates system 100 that includes compliance platform 102, user device 140, external auditor 144, and a plurality of compliance entities 142. It is appreciated that, for the purposes of this disclosure, when an element includes a plurality of similar elements distinguished by a letter following the ordinal indicator (e.g., compliance entities "142A," "142B," and "142C") and reference is made to only the ordinal indicator itself (e.g., "142"), such a reference is applicable to all the similar elements.

Within system 100, the various portions are communicatively coupled via communications network 170. Communications network 170 may be any wired or wireless communications connection that allows for data to be sent. Network 170 may be, for example, a wired Ethernet connection or a wireless connection such as WiFi, 3G, 4G, 5G, or another such connection that allows for data to be transmitted. In various embodiments, the various components of the systems described herein may utilize one, some, or all of such data connections to communicate and/or receive data.

Compliance platform 102 may include jurisdiction database 104, form database 106, workflow database 108, returns database 110, machine learning database 112, workflow module 114, memory 120, processor 122, auditor 124, role-permission module 126, communication module 128, compliance module 130, training module 132, location module 134, and machine learning module 136. The various elements of compliance platform 102 may be electromagnetically (e.g., communicatively) coupled with each other. Such coupling may allow for various elements of compliance platform 102 to send and receive data from other elements. In various embodiments, the databases and modules of compliance platform 102 may, in certain embodiments, be physically separate from each other (e.g., may be separate components and/or physical databases) to provide for increased privacy and data security. Furthermore, the database and/or modules may be configured to perform separate portions of compliance and/or store data of separate formats (e.g., data that includes different types of information or sensitive information). Thus, separation of the databases and modules allows for the techniques to be performed and data to be accessed in a resource efficient manner and for data privacy to be maintained, as described herein.

Memory 120 may be any type of memory device configured to store data and/or instructions. Memory 120 may be, for example, a harddrive, a solid state device, and/or random access memory (RAM) and may include transitory or non-transitory computer-readable media. Memory 120 may be configured to store instructions for performing the techniques described herein. Such instructions may be communicated to various elements of compliance platform 102, such as processor 122.

Processor 122 may be a single or multi-core processor. As described herein, processor 122 may be configured to perform operations of compliance platform 102, as described herein. Processor 122 may be any type of single or multi-core processor that allows for electronic data processing. It is appreciated that processor 122 may perform the techniques described herein utilizing one or more databases, modules, and/or other system components as described herein. Accordingly, processor 122 may perform the techniques described herein while calling upon the databases, modules, and/or other system components. In certain embodiments, such modules and/or other system components may be called by processor 122 as one or more APIs.

Jurisdiction database 104, form database 106, workflow database 108, returns database 110, and machine learning database 112 may be databases that include, for example, harddrives, solid state devices, cloud storage, blockchains, random access memory (RAM), and/or other such storage devices. The various databases may be separate from each other and may, thus, each be configured to store data of a specific type to maintain privacy and data security for compliance platform 102.

Thus, for example, jurisdiction database 104 may be configured to store data related to various specific jurisdictions. For example, jurisdiction database 104 may be configured to store data related to the compliance requirements of a plurality of different jurisdictions associated with users of jurisdiction database 104 (e.g., the users may be operating or doing business within such jurisdictions). Thus, for example, jurisdiction database 104 may be configured to store data indicating the requirements that are needed to comply with the requirements of the various jurisdictions (e.g., the types of data that are required to be provided to be in compliance for the jurisdiction). In various embodiments, reference to a "jurisdiction" may include locations that are traditionally associated with jurisdictions, but may also include other entities that require compliance, such as insurance entities, human resource entities, and/or other such entities. Thus, it is appreciated that, for the purposes of this disclosure, "jurisdiction" may refer to traditional geographical or legal entities, but may also refer to other entities for which compliance with certain regulations or requirements are needed.

In various embodiments, data required by the various jurisdiction for compliance may include, for example, name, date of birth, procedure performed, pricing, healthcare provider comments, prescription, and/or other such data. Jurisdiction database 104 may, thus, be compartmentalized into various different jurisdictions. The data required by each jurisdiction for a submission to be in compliance (e.g., via a form) may include one or more of such types of data. In various embodiments, jurisdiction database 104 may indicate the data required by each jurisdiction. In certain embodiments, jurisdiction database 104 may include data linking to the original source of the regulations and/or requirements and/or may include copies of the original documents themselves (e.g., compliance platform 102 may download the original documents for storage within jurisdiction database 104). In certain such embodiments, workflows that are provided to a user may include the links and/or copies of the original document, to allow for the user access to the original documents, for reference.

Forms for completion and workflows to fill out the forms and comply with the requirements of the jurisdiction may be stored within form database 106 and workflow database 108, respectively. Returns database 110 may be configured to stored completed forms and/or returned data from workflows communicated to users, as such completed forms may include sensitive information that needs to comply with certain privacy requirements. Though reference may be made herein to workflows as forms, other embodiments may include workflows in the form of charts, graphs, and/or other such workflows. For the purposes of this disclosure, it is appreciated that "workflow" may refer to any instrument for compliance, such as instruments where users and/or other parties are required to provide data (e.g., answers or feedback).

Form database 106 may be configured to store form data. Such form data may include, for example, forms used for compliance for healthcare providers, professionals, patients, and/or other parties. In various embodiments, the forms stored within form database 106 may be blank forms without any sensitive information. In certain embodiments, the forms may be forms that are configured to be shared by a plurality of different jurisdictions and may include one or more categories (e.g., questions and/or entries for data) that are only needed for one or some of the plurality of jurisdictions. In certain embodiments, form database 106 may be configured to store and provide forms associated with specific subject matters. Thus, for example, the forms within form database 106 may be stored according to subject matter (e.g., different categories of compliance). Form database 106 may store a number of forms for each certain subject matter that is less than the total number of jurisdictions (e.g., within jurisdiction database 104).

Workflow database 108 may accordingly provide data so that the form is configured for the appropriate jurisdiction, allowing for one or more forms to be shared for a plurality of jurisdictions while being appropriate for use in each of the plurality of jurisdictions. Additionally or alternatively, workflow database 108 may receive form data and create an appropriate workflow for the user. Such a workflow may not be the form itself but may, instead, be various requests for data (e.g., questionnaires) provided to the user. Compliance platform 102 may then receive reply data from the user, in response to the requests for data and fill out the appropriate forms or provide or store the data as needed in order to meet compliance requirements (e.g., while certain compliance actions may require the submission of certain filled out forms, other compliances actions may only require that the entity obtain and store such data). Reply data may be stored within returns database 110 as returns data.

As such, workflow database 108 may be configured to store workflows associated with the forms. Workflow database 108 may, thus, store workflows for completing forms or a combination of forms provided by form database 106, according to the jurisdiction associated with the form (e.g., the jurisdiction for compliance). Thus, in various embodiments, form database 106 may be accessed to obtain the appropriate form and jurisdiction data may be accessed (e.g., from jurisdiction database 104) to determine the jurisdiction associated with the compliance. Based on the form used and the jurisdiction for compliance (e.g., the physical area, such as state, municipality, country, country, and/or other such, the healthcare provider, the insurance provider, and/or other such jurisdiction), data from workflow database 108 may be accessed to determine the portions of the form that is required to be completed for compliance within the jurisdiction.

Typically, for a form of a given subject matter (e.g., a form provided to indicate after patient care), each separate jurisdiction may include separate information requirements. Accordingly, each jurisdiction may include a form that is unique to the jurisdiction and the subject matter. Thus, if there is six different subject matters and 8 different jurisdictions, 48 different forms are required to be stored. Significant memory resources are required for storage and, furthermore, significant processing resources are required to select the appropriate form. Additionally, such forms may not be of the same format (e.g., file format) and so files cannot be shared between different programs.

In certain embodiments, form database 106 may store a form (e.g., a biopsychosocial form) that may include some or all of the questions of the forms of form database 106. Such a form may change the questions that are displayed to a user based on the answers provided by the user. Accordingly, the workflow associated with the form (which may be stormed within form database 106 and/or workflow database 108) may determine which portions of the form to display to the user, based on the user's previous responses in other portions of the form.

Such a form, as the base form is shared, is of the same file format. Accordingly, various entities, practitioners, and/or other users that require compliance may all share the single form with the single file format. Thus, all compliance entities (e.g., entities that perform and/or require compliance) may share forms and data, allowing for compliance to be verified regardless of jurisdiction and entity.

Thus, the configuration of compliance platform 102 allows for a single form (e.g., a biopsychosocial form) to be shared between a plurality of jurisdictions that include different requirements, conserving memory and processing resources required to select the appropriate form. A single form may, additionally or alternatively, be shared between a plurality of subject matters, further conserving memory and processing resources. Furthermore, as regulations and requirements are constantly changing, especially when there is a large number of jurisdictions that may each include separate requirements, having a single form controlled by a workflow (e.g., stored within workflow database 108) may allow for simplified updating based on such changes, without the need to update the underlying form and/or only requiring the updating of one form for multiple jurisdictions and/or subject matters, further conserving changes and system resources. For example, in certain such situations, only the workflow may need to be updated as the underlying form may include sections that already conform with the updated requirements, but were not yet part of the workflow or included within the workflow as a non-conforming portion. Updating only the workflow may result in significant resource savings when conforming to updated regulations.

Returns database 110 may be configured to store data provided by one or more users, such as completed forms as well as data associated with one or more users and/or entities. Such data may, for example, be data that includes sensitive patient or employee information (e.g., name, date of birth, place of residence, family members, identification number, credit card number, and/or other such information). Returns database 110 may, thus, be separate from other databases to protect sensitive patient information. Returns database 110 may be configured to store forms that have been created and/or filled out for specific patients. Additionally or alternatively, returns database 110 may be configured to allow for limited access to data stored within returns database 110, as needed, according to the techniques described herein.

In certain embodiments, returns database 110 may be configured to include separate storage for each compliance entity (e.g., entity such as healthcare provider, healthcare group, and/or other such groups). The storage may be separate portions of a database and/or may be physically separate databases. Separating storage of different entities within returns database 110 may provide for increased data security.

Returns database 110 may be configured to store some or all data provided by users and/or compliance entities (that are required to be in compliance with one or more compliance requirements). In various embodiments, returns database 110 may include a time component to the data to indicate the data when the data was completed (e.g., the time when a compliance action was performed by the user) and/or provided to returns database 110. In certain embodiments, the time component may be a specific point in time. In other embodiments, the time component may be one duration (e.g., the duration when the action was performed).

Returns database 110, processor 122, and/or other components of platform 102 may be configured to receive data in a plurality of different formats and standardize the data for storage within returns database 110. Currently, various industries, including the medical industry, store records in disparate formats. For example, different medical providers, insurance providers, doctors offices, billing services, and/or other such entities may store data in formats that are not compatible with each other. Accordingly, for example, returns database 110 may be configured to perform voice (e.g., recording) recognition, text recognition, and/or break down the components of data into various determinations (e.g., what the data is directed to, what the data indicates, the deadlines indicated by the data, the type of actions needed for compliance, and/or other such data components). Returns database 110 may then be configured to, for example, reconstruct the data to a standardized format, so that various compliance requirements of different users and/or entities, provided in different data formats, may be standardized into a standard data format.

In certain embodiments, returns database 110 may be configured to determine standards for medical records used in compliance. Thus, for example, returns database 110 and/or machine learning module 136 may parse the data stored within returns database 110 and determine a common standard so that all entities that require compliance can utilize the data standard for their compliance data.

In various such embodiments, returns database 110 may be or incorporate one or more blockchains. Returns data may be written to the blockchain. As blockchains are publicly facing databases that may require verification from one or more stakeholders, data stored within the blockchain may be stored and any changes or tampering of such data may be easily detected. As the auditing techniques (e.g., for determining compliance ratings) described herein may depend upon the time or timeframe of completion, storing returns data on such blockchains may allow for reliable determination of the time aspect of the provided returns data.

Workflow module 114 may be configured to determine workflows according to the techniques described herein. Workflow module 114 may, in certain embodiments, be accessible or callable as an API, according to the techniques described herein. Thus, workflow module 114 may receive a request or call from a user device requesting a workflow for compliance and accordingly, determine the workflow. The workflow may be determined from data within the databases of compliance platform 102. It is appreciated that, for the purposes of this disclosure, the modules described herein may include or be implemented as APIs to allow for users to call upon the functions of the modules independently.

In various embodiments, such APIs may allow for third party users providing services to other parties to integrate the techniques within their systems, allowing for such third party users to provide services for the techniques described herein. For example, an insurance company may utilize the APIs described herein to provide for compliance services to their member doctors. In such embodiments, the third party users may utilize some or all of the services of compliance platform 102. Thus, for example, a third party user utilizing workflow module 114 as an API may also utilize and store data within the databases of compliance platform 102, or utilize data stored elsewhere. In other embodiments, such APIs may allow for an entity to access certain compliance techniques and utilize compliance platform 102 as their version of a virtual compliance officer, without requiring an actual in-organization compliance officer. Additionally or alternatively, the APIs may allow for members of the entity to provide data related to compliance, in order to meet the compliance requirements of the entity.

Machine learning database 112 may be a database configured to provide data for training of machine learning module 136. Machine learning database 112 may include data specifically curated to provide machine learning training. Data within machine learning database 112 may be actual data that has been previously provided and/or may be data specifically configured for training of machine learning module 136. Such data may provide for training of machine learning module 136 to, for example, determine updates to requirements (e.g., of one or more jurisdictions and/or for one or more subject matters) and the changes required to various forms to be in compliance with the updated requirements.

Machine learning module 136 may be configured to perform machine learning of various techniques described herein. For example, machine learning module 136 may be a neural network and/or another module configured to receive data and provide outputs. Thus, for example, machine learning module 136 may be configured to receive data indicating regulatory updates within a jurisdiction (e.g., updated language) and determine the scope of the updates (e.g., the updates within a specific legal language) and/or be configured to determine situations where a user may be incorrectly provided responses to requested data.

In various jurisdictions, diction utilized to describe legal concepts and/or requirements may vary. For example, a first jurisdiction may utilize a first format (e.g., bullet points) and first diction (e.g., lots of traditional Latin phrases) while a second jurisdiction may utilize a second format (e.g., paragraphs) and second diction (e.g., plain language). Machine learning module 136 may be configured to receive data utilizing any such format, diction, and/or other aspects that are different and determine the regulatory requirements in a standardized format, based on training.

Based on the determined regulation changes, machine learning module 136 may be configured to determine any changes to the forms and/or to the workflow that is necessary to be in compliance with the updated regulations. Machine learning module 136 may then access the corresponding form and/or workflow and update accordingly. The updated form and/or workflow may be associated with the appropriate jurisdiction. Machine learning module 136 may then provide the updated form and/or workflow to form database 106 and/or workflow database 108 for storage and use. In other embodiments, machine learning module 136 may be configured to determine the requirements of new regulations and/or requirements and create new forms and/or workflows accordingly.

Auditor 124 may be configured to perform automated audits of portions of compliance database 102. Thus, for example, auditor 124 may be configured to audit the data of jurisdiction database 104, form database 106, workflow database 108, and/or completed responses within returns database 110 to determine if such data are still in compliance within their respective jurisdictions (e.g., the regulations and/or requirements of jurisdictions such as location, entity, subject matter, and/or other such jurisdictions). Auditor 124 may be configured to perform audits within regular timeframes (e.g., every hours) and may be configured to audit a certain portion of data (e.g., a set portion or a random portion of data) or all data.

In certain embodiments, auditor 124 may be configured to provide compliance ratings, according to the techniques described herein. Such compliance ratings may indicate the percentage completion of an organization with the requirements for compliance, the risk of the organization for being out of compliance (e.g., based on historical data), and/or the likelihood of an organization being in compliance with the requirements by the end of the compliance period. The compliance ratings may be updated as time passes (e.g., in real time or near real time). The compliance rating may be determined by the data provided by the users (e.g., the organization that needs to be in compliance) and may indicate the reliability of the data (e.g., based on the time aspect of the data). In various embodiments, auditor 124 may be configured to provide recommendations so that users may be in compliance by the end of the compliance period.

In various embodiments, auditor 124 may be configured to receive data in a plurality of different formats and standardize the data in order to provide for standardized auditing. Standardization of data may be according to the techniques described herein. For example, auditor 124 may be configured to receive data from various sources (e.g., from an organization) and perform voice recognition, text recognition, and/or break down the components of data into various determinations and then reconstruct the data to a standardized format. The data in the standardized format may then be audited by auditor 124 by comparing the standardized data to the requirements of the target jurisdiction.

Alternatively or additionally, auditor 124 may be configured to receive data standardized from other modules (e.g., any of the modules of platform 102, according to the techniques described herein) and perform auditing from such data. In other embodiments, auditor 124 may be configured to perform auditing without standardization of data and may, instead, perform auditing on the native data format. In such a configuration, auditor 124 may be configured to determine insights from the data provided and auditor 124 may output such insights in a standardized format (e.g., file format, data shape, data storage configuration, and/or other such formatting). The insights may then be compared to the compliance requirements stored within the databases of platform 102.

In various embodiments, auditor 124 may be granted certain permissions. The permissions may allow for auditor 124 to audit only certain portions of data or all data within compliance platform 102. Thus, the permissions may determine the level of audit performed by auditor 124.

Role/permission module 126 may be configured to determine the permission of auditor 124 as well as various users and allow such parties the appropriate access to the rest of compliance platform 102. Thus, for example, users within an organization may be authorized to access different levels of sensitive data (e.g., patient data). Based on the level of access, such users may be permitted to access various forms, workflows, and/or patient data from the respective databases. Role/permission module 126 may store data related to such permission levels, associated with various users, roles, and/or modules. Thus, role/permission module 126 may also determine appropriate permission levels for various modules of compliance platform 102 (e.g., for auditor 124).

Communication module 128 may be configured to communicate with various external devices, via communications network 170. Thus, for example, communication module 128 may be configured to communicate with user device 140, external auditor 144, and compliance entities 142 (e.g., receive and/or provide data to such elements). Such data may be utilized to perform the techniques described herein.

Compliance module 130 may be configured to determine compliance of workflows, according to various jurisdictions. Compliance module 130 may determine compliance of the various workflows according to the regulations and/or requirements of various jurisdiction. In certain embodiments, compliance module 130 may be configured to determine compliance of workflows that are currently processing and/or created/stored on compliance platform 102, according to the techniques described herein, as opposed to auditor 124, which may be configured to determine compliance of data within databases (e.g., user stored data that have been provided by users) and, thus, determine compliance of an entity.

In certain embodiments, compliance module 130 and/or returns database 110 may be configured to receive grievance claims from various users. Such grievances may be provided by, for example, patients and/or employees of entities associated with compliance platform 102. Grievance data may be received and accordingly stored within returns database 110. Grievance data may be provided to, for example, auditor 124 and/or external auditor 144 to determine compliance of the entity identified associated with the grievance data with the regulations and/or requirements of various jurisdictions. In certain embodiments, grievance data may affect the compliance status of the entity.

Determination of conformance/compliance of workflows to regulations and auditing data is more efficiently performed separately, as workflows are determined in the moment, while auditing may possibly involve auditing based on updates to regulations or requirements. The configuration of compliance platform 102 allows for compliance module 130 to be more efficiently configured to determine compliance of workflows in progress while auditor 124 may be configured to determine data to be audited and audit such data.

Training module 132 may be configured to provide for training of various users according to the regulations. Thus, training module 132 may receive data directed to jurisdictions, forms, workflows and/or other data and provide training regimes to users for utilization of workflows provided herein. In various embodiments, a user may request compliance with a jurisdiction and a workflow may be provided in response. Training module 132 may provide training instructions for completing the workflow. In other embodiments, training module 132 may provide general instructions completing workflows, not associated with specific workflows.

In further embodiments, training module 132 may be configured to provide training to members of an entity so that the entity may be in compliance with rules, regulations, and/or requirements of a jurisdiction. For example, training module 132 may provide training for personnel of an entity to perform job operations for the entity to meet compliance requirements. Accordingly, for example, jurisdiction database 104 may further include data on techniques for training members of an entity so that the entity is in compliance. In another embodiment, machine learning module 136 may, based on the jurisdiction data and, possibly, training data that includes existing training techniques, determine training programs to be provided to users/entities in order to bring the entity within compliance. In certain embodiments, such training may include receiving data from the members, such as the results of quizzes and/or feedback. Such data may be stored within, for example, returns database 110.

Location module 134 may be configured to receive location data from user device 140 and/or another electronic device. Location module 134 may, thus, receive location data associated with compliance from an electronic device. Such location data may include, for example, GPS or other location data from a user device (e.g., a user device of a healthcare requester or account holder) and/or from a provider (e.g., a healthcare provider requiring compliance services).

User device 140 may be a user device of a user of compliance platform 102. Such a user may be, for example, a user associated with an entity that needs to be in compliance (e.g., a healthcare provider), a patient, and/or another such user. User device 140 may be, for example, desktop computing devices, portable computing devices (e.g., laptops, tablets, smartphones, and/or other electronic devices), wearable devices, and/or other such electronic devices. In various embodiments, a plurality of user devices associated with one or more users may be communicatively coupled to compliance platform 102.

Compliance entities 142 may be electronic devices associated with various entities that include regulations to be complied with. Such compliance entities 142 may include, for example, legal databases of various geographical locations (e.g., municipalities, cities, counties, states, provinces, countries, and/or other geographical locations), insurance entities, regulatory bodies, and/or other such entities that provide for regulations that need to be complied with. In certain embodiments, compliance entities 142 may include electronic devices configured to provide regulatory data.

External auditor 144 may be an auditing body associated with one or more compliance entities. External auditor 144 may be an auditor for such bodies configured to determine whether a user (e.g., healthcare provider) is conforming to the regulation of the associated compliance entity. In various embodiments, external auditor 144 may be configured to access compliance platform 102 to perform such audits. Permission of external auditor 144 to access sensitive data within compliance platform 102 may be controlled by role/permission module 126.

Figure 2:
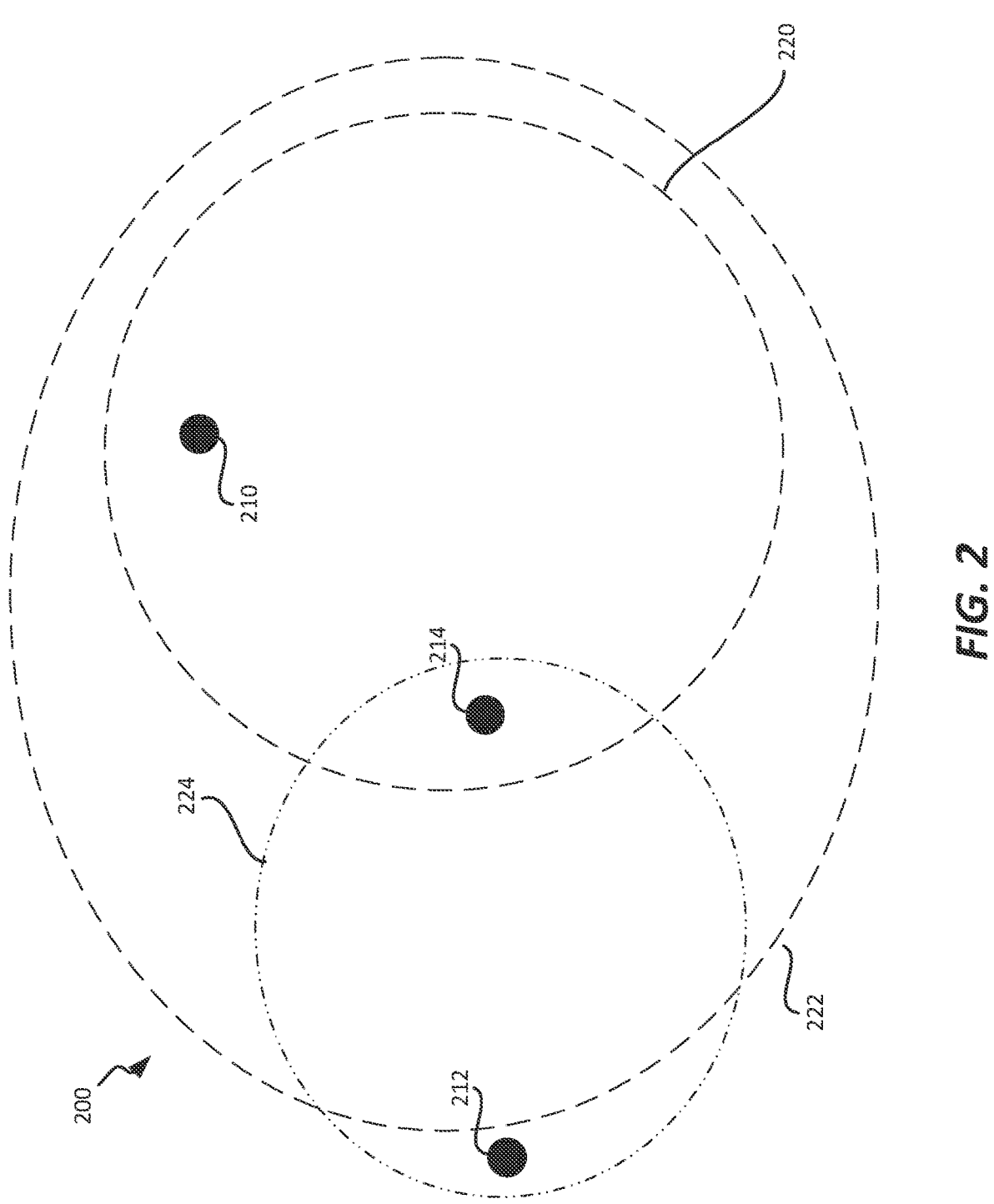
FIG. 2 illustrates an example of geofences for compliance dataflow management, in accordance with some embodiments.

FIG. 2 illustrates an example of geofences for compliance dataflow management, in accordance with some embodiments. FIG. 2 illustrates example 200 that includes users 210, 212, and 214 and geofences 220, 222, and 224.

Users 210, 212, and 214 may be various users (e.g., individuals or organizations) requiring compliance with one or more entities (e.g., municipalities, cities, counties, states, provinces, countries, other geographical locations, insurance entities, regulatory bodies, and/or other such entities). Geofences 220, 222, and 224 may be geofences associated with the location of various such entities. Thus, users within such geofences may require compliance with the entities of the associated entities.

The systems and techniques described herein may utilize geofences to determine the entities (e.g., the regulations thereof) that a user needs to comply with. As such, the systems and techniques described herein may erect geofences to denote areas that the various entities cover. As shown in example 200, user 212 is located within geofence 224. Thus, user 212 may be required to only comply with the regulations of the entity of geofence 224. Meanwhile, user 214 is located within the overlapping portions of geofences 220, 222, and 224. Thus, user 214 may be required to comply with the regulations of the entities associated with geofences 220, 222, and 224. User 210 is located within geofences 220 and 222 and, thus, may be required to comply with the regulations of the entity of geofences 220 and 222.

The compliance platform described herein may be configured to determine the location of various users via, at least, geofences. Such geofences may be created by, for example, location module 134 and determined via, for example, location data (e.g., GPS device) received from the user devices. The compliance platform may then automatically determine the regulations of the jurisdictions that need to be complied with from such data and, for example, access the appropriate jurisdiction database, form database, and/or workflow database, accordingly.

Variously, the geofences may be associated with different forms of jurisdictions. Thus, though certain geofences may be associated with geographical jurisdictions (e.g., for compliance with regulations of a location), other geofences may denote the operational boundaries of entities such as insurance entities. Accordingly, geofences may be utilized for determining whether compliance is required with many different types of entities.

Figure 3:
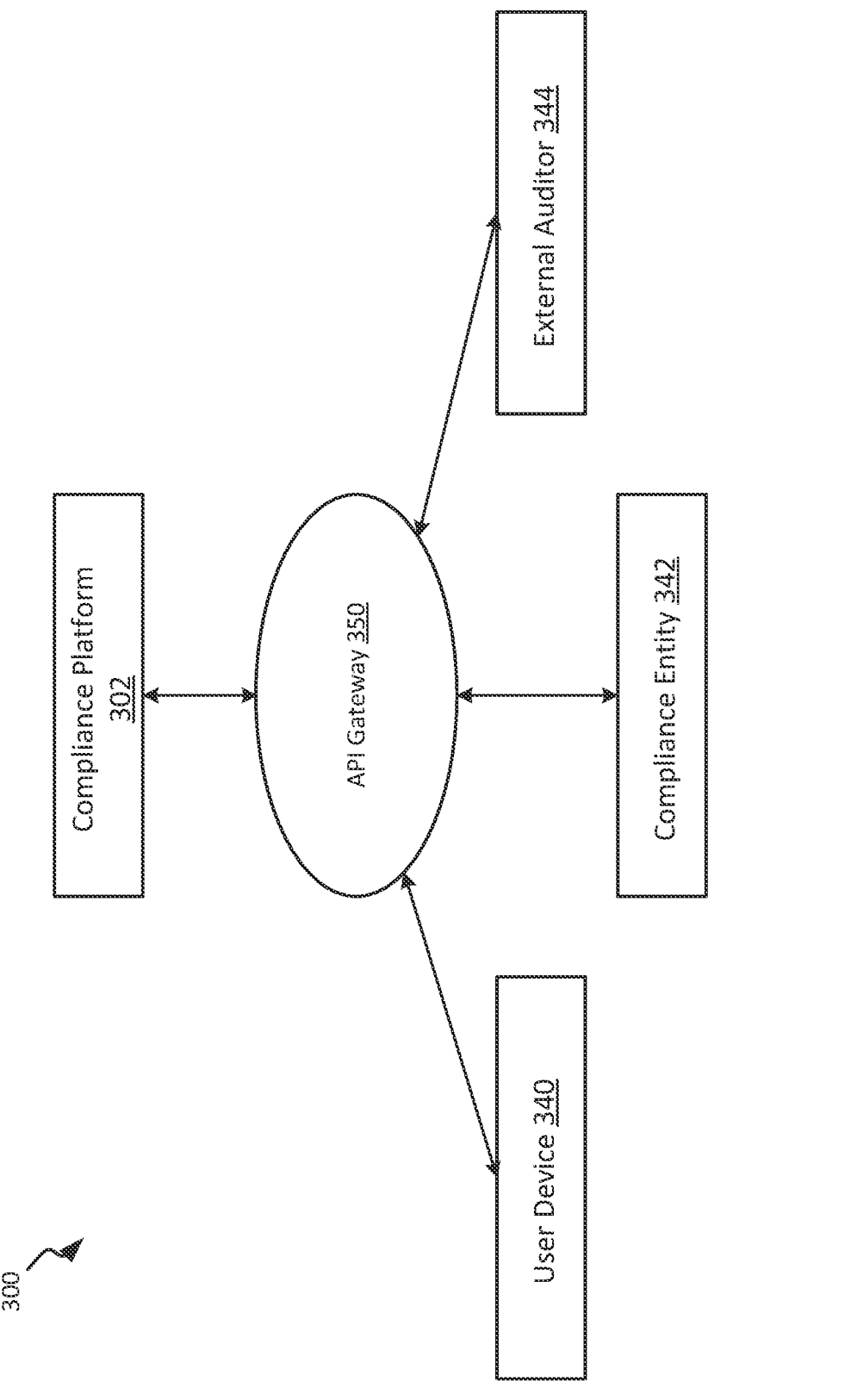
FIG. 3 illustrates a block diagram of another example system for compliance dataflow management, in accordance with some embodiments.

FIG. 3 illustrates a block diagram of another example system for compliance dataflow management, in accordance with some embodiments. FIG. 3 illustrates system 300, which is configured to implement the techniques and processes described herein. System 300 may include compliance platform 302, API gateway 350, user device 340, compliance entity 342, and external auditor 344.

User device 340, compliance entity 342, and external auditor 344 may be as described herein. One or more of user device 340, compliance entity 342, and external auditor 344 may be configured to access the various functions of compliance platform 302 via API gateway 350. Thus, the various techniques of compliance platform 302 may be configured as one or more APIs and API gateway 350 may provide access to the APIs of compliance platform 302. For example, API gateway 350 may receive log-in or authentication credentials from a user of user device 340. API gateway 350 may verify that the requesting entity includes the appropriate authorization to access the requested API. Based such credentials, API gateway 350 may then allow for user device 340 to access an API of compliance platform 302 (e.g., an API allowing for a workflow to be provided to user device 340 to onboard a new patient).

In certain embodiments, compliance platform 302 may be configured to provide auditing (e.g., compliance ratings) according to the techniques described herein. User device 340, compliance entity 342, and/or external auditor 344 may query compliance platform 302 for the results of such auditing. The query may be via API gateway 350 and may be through one or more APIs provided by compliance platform 302.

The various systems and techniques described herein may be provided as one or more APIs. Thus, for example, each of the techniques of FIGS. 4-7C may utilize one or more separate APIs. Furthermore, in certain embodiments, portions of techniques, such as accessing one or more databases, may be separate APIs. Thus, authentication of a user and determination of the access privileges of the user may be provided by one API while physical access to the database may be provided as a separate API. Such a configuration allows for individual techniques described herein, or portions thereof, to be utilized by third parties. Thus, users may comply with the regulations and/or requirements of certain jurisdictions by calling just the APIs related with the action. In certain embodiments, APIs may additionally allow for the verification of licenses of a target (e.g., a compliance workflow may include such verification, and an API may be called to verify the license of the target for compliance, such as a doctor, through access to the appropriate device or database).

FIGS. 4-6C are process flowcharts illustrating various techniques or portion thereof for determining compliance ratings, in accordance with some embodiments. Each of the techniques of FIGS. 4-7C may be implemented as one or more APIs, according to the techniques described herein.

Figure 4:
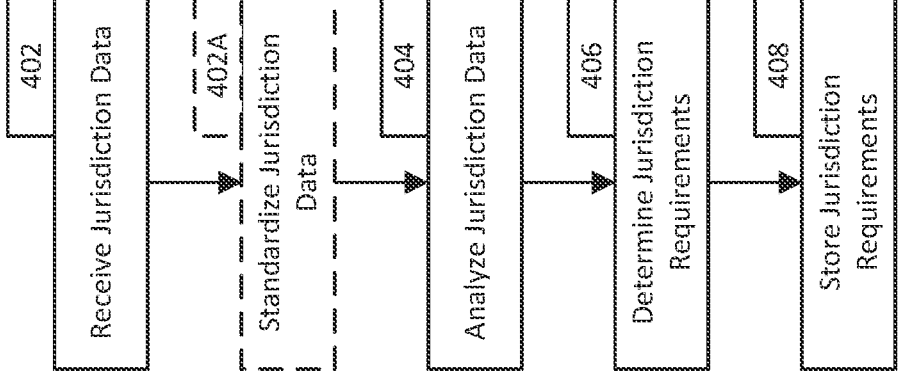
FIGS. 4-6D are process flowcharts illustrating various techniques or portion thereof for determining compliance ratings, in accordance with some embodiments.
Figure 4:

FIG. 4 is a process flowchart illustrating a technique of determining and storing jurisdiction requirements (e.g., for determining compliance ratings). In various embodiments, jurisdiction requirements for compliance (e.g., for certain geographical regions, certain subject matter, certain compliance organizations, and/or other jurisdiction aspects) may be determined. The jurisdiction requirements may be utilized to determine compliance ratings (e.g., in a current time) for a user of the compliance platform.

Thus, technique 400 of FIG. 4 allows for the determination of jurisdiction requirements that may be utilized in the determination of compliance ratings. Technique 400 may be utilized for determination the jurisdiction requirements of newly created compliance requirements, updated compliance requirements, and/or other situations where the requirements for compliance have changed.

In 402, jurisdiction data may be received by the compliance platform according to the techniques described herein. Jurisdiction data may include data indicating the requirements for compliance with the requirements of the jurisdiction (e.g., the category, geographical area, compliance entity, and/or other such jurisdiction). Jurisdiction data may be provided by the compliance entity, by a third party, and/or through other such techniques. In certain embodiments, jurisdiction data may be received in a non-standard format and such data may be standardized in 402A. Standardization of the data may be according to the techniques described herein.

In 404, the jurisdiction data may be analyzed. Analysis of the jurisdiction data may include any of the techniques described herein, such as through natural language detection and processing, conversion of categories and requirements into numerical data, manual analysis, machine learning, and/or other such techniques.

In certain embodiments, the jurisdiction data may be of a specific data shape and analysis of the jurisdiction data may include analyzing data of the data shape to determine the insights. In certain such embodiments, data of the data shape may be compared to various pre-constructed templates. Such templates may be configured with various compliance categories, such as subject matter, deadline, inspection actions, reporting actions, confirmations, and/or other such categories. As the data is in a specific data shape, the jurisdiction data may be structured into specific data categories. Analysis of the jurisdiction data may include comparing the jurisdiction data to the categories of the templates, to determine the requirements of the jurisdictions in a resource and time efficient manner. In certain embodiments, the jurisdiction requirements may be analyzed based on their own requirements according to the techniques described herein, based on the requirements of other jurisdictions (e.g., other categories, geographical areas, compliance entities, and/or other such jurisdictions), and/or through another such technique.

In 406, based on the analysis, the jurisdiction requirements may be determined. Determining the jurisdiction requirements may include accessing jurisdiction database 104 and accessing the requirements data for the specific jurisdiction. The specific jurisdiction of the data accessed may correspond to the jurisdiction of the jurisdiction data (e.g., of the same compliance entity, geographical location, practice area, time period, and/or other details for the requested compliance).

Analysis of the data accessed may indicate the jurisdiction requirements. The jurisdiction requirements may indicate the data that a user and/or organization is required to provide to be in compliance for a certain jurisdiction and/or subject matter. The jurisdiction requirements may also indicate the level of conformity to the requirements that is needed in order to be in compliance (e.g., if data corresponding to 80% of the categories are needed to be in compliance). Other jurisdiction requirements may also be determined. In 408, the jurisdiction requirements may be stored within the databases.

In certain embodiments, the jurisdiction requirements may allow platform 102 to determine standards for medical records used in compliance. The jurisdiction requirements may, thus, inform the various requirements that are required for compliance data. A standardized data format may be determined for compliance data that may allow for fulfillment of the requirements of all jurisdictions or certain jurisdictions. For example, certain jurisdictions may require electronic signatures as well as timer based time keeping. Thus, the data standard for compliance may be a standard that encompasses both electronic signatures as well as timer based time keeping.

Figure 5:
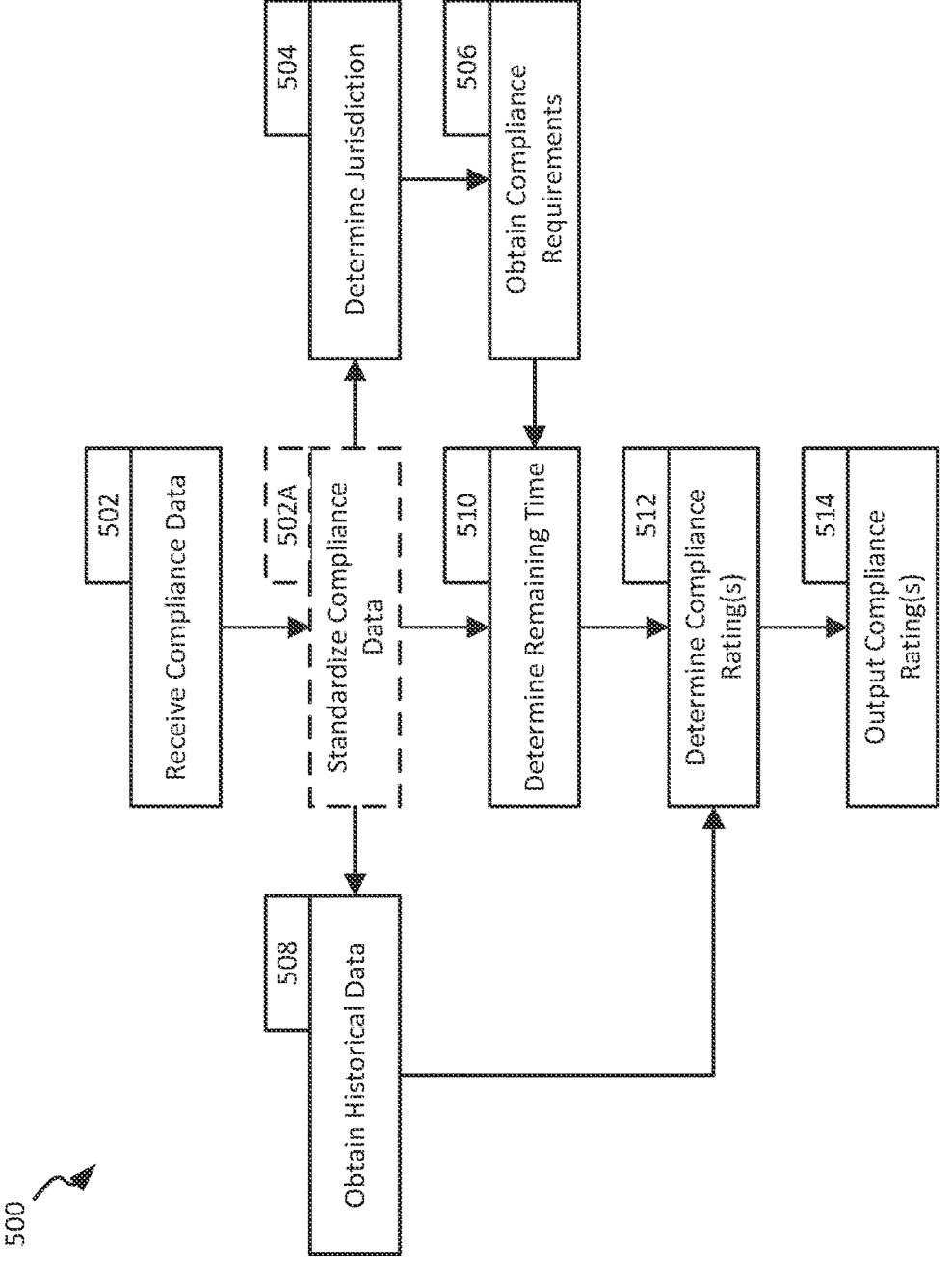

FIG. 5 is a process flowchart illustrating a technique for determining a compliance rating. Technique 500 of FIG. 5 allows for a determination of a compliance rating that may reflect, in certain embodiments, the state of compliance of an entity with the requirements of one or more jurisdictions. In certain embodiments, the compliance rating may be associated the level of compliance with the requirements of the jurisdictions at a moment in time (e.g., currently) and/or with the compliance risk of the organization, such as the risk that the organization may not be in compliance, based on historical data.

In certain embodiments the compliance rating may be a numerical rating, grade rating, summary (e.g., a summary of the compliance requirements that have been fulfilled, are likely to be fulfilled, are unlikely to be fulfilled, and/or are impossible to fulfill), and/or another style of rating.

In 502, compliance data may be received. Compliance data may be received from, for example, a user device. In various embodiments, the compliance data may be provided by the compliance entity, an individual user, a compliance officer, and/or another user that may provide compliance data. Compliance data may be data indicating one or more aspects of compliance, as described herein.

In various embodiments, the compliance data received may be of a non-standardized format. Thus, for example, compliance data may be data generated by the entity. Such data may be generated by software and/or manually. Accordingly, the data may be of a non-standard data shape. In 502A, the non-standard compliance data may be standardized, according to the techniques described herein. Standardization of the compliance data may allow for consistent determination of the state of compliance of the entity. Accordingly, standardized data may allow for the determination and analysis of the data performed in other portions of technique 500.

The compliance platform may receive the compliance data and determine the category for compliance (e.g., jurisdiction for compliance, including the geographical area, the subject matter, and/or other aspects). In certain embodiments, the compliance data may indicate the category for compliance, but other embodiments may not indicate the category and the compliance platform may, instead, be configured to determine the category for compliance based on the nature of the compliance data received. Thus, for example, the compliance platform may determine that the compliance data includes data showing a certain filled out form and such a form may be associated with a certain compliance category. In another embodiment, the compliance platform may receive standardized data and determine the various data categories present in the standardized data (e.g., the practitioner, the procedure, the location, the patient, the procedure performed, and/or other such data) and, based on the data categories present, determine the compliance category (e.g., what subject of compliance the data is directed towards indicating). Based on that determination, the compliance platform may determine the appropriate category.

In various embodiments, the compliance platform may determine the jurisdiction (e.g., compliance category) associated with the compliance data, in 504. Based on the jurisdiction, the compliance requirements may be determined in 506. Thus, for example, the compliance platform may access jurisdiction database 104 to determine the compliance requirements.

The compliance data may also indicate the time remaining for the compliance period. That is, certain compliance categories may include periods where compliance must be completed. Before the end of the period, the entity may provide various data and/or assertions to be in compliance. Actions may be undertaken by the entity to progress to be in compliance with the requirements of the jurisdiction. At the end of the period, the entity is either in compliance or not in compliance. Other embodiments may determine the remaining time by accessing the appropriate database (e.g., jurisdiction database 104) based on the determined category of compliance (e.g., from the compliance data). The remaining time for compliance may be determined in 510. The remaining time for compliance and the compliance requirements may then allow for the compliance platform to determine the items that are still remaining for the entity to be in compliance and the time remaining to perform those items.

The compliance data may also determine the identity of the user and/or entity from the compliance data. Historical data (e.g., from returns database 110) may be accordingly accessed in 508. The historical data may allow for the compliance platform to determine various patterns and/or likely behaviors of the entity. For example, in certain embodiments, the compliance platform may analyze the historical data and determine that, for a certain compliance category, the entity typically requires two weeks to complete a compliance category, from communication of initial data to fully completing the category. Other examples may include determining the typical times during the compliance period that the entity completes certain compliance categories. In various embodiments, the historical data may include the historical data associated with the compliance entity as well as the historical data of other entities. Thus, the compliance platform may utilize the historical data associated with other entities to determine the likelihood of compliance of the compliance entity and, thus, the risk of non-compliance by the compliance entity.

In 512, a compliance rating may be determined. The compliance rating may be determined based on the compliance requirements, the historical data, and/or other data such as the remaining time for compliance. The compliance platform may, for example, determine the percentage of compliance of the entity, such as the percentage of the requirements that the entity has currently fulfilled. Such a rating may be updated in real time or near real time. Accordingly, for example, certain compliance tasks may be required to be performed daily, hourly, or for another time interval. The compliance rating for current compliance may, thus, change based on whether the task has been performed for the time interval.

The compliance platform may also determine the risk, based on historical data, of the entity being in compliance or non-compliance. For example, in certain embodiments, the compliance platform may determine whether there is sufficient remaining time for the entity to complete the uncompleted compliance tasks and whether the entity is likely to complete the uncompleted compliance tasks in the remaining time. The compliance rating may, in certain embodiments, be a numerical rating indicating such likelihood or another such rating.

The compliance rating may then be accordingly output in 514. The compliance rating may be communicated as data to the user device, according to the techniques described herein. In certain embodiments, the compliance rating may be communicated along with instructions as to how the entity may become in compliance.

Figure 6A:
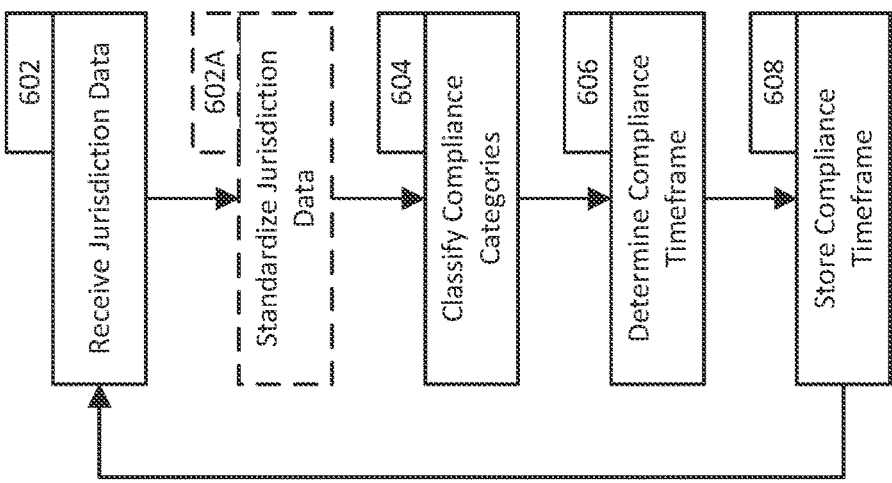

FIG. 6A illustrates technique 600A where a compliance platform determines a compliance timeframe for a compliance item. In 602, jurisdiction data associated with the compliance item is received, according to the techniques described herein. The compliance platform, upon receiving the jurisdiction data, may analyze the jurisdiction data to determine what is needed for the entity to fulfill the compliance requirements. In certain embodiments, the jurisdiction data received may be non-standard and 602A may standardize the jurisdiction data according to the techniques described herein.

In 604, based on the analysis of the jurisdiction data, the compliance category (e.g., the compliance organization, subject matter, and/or subcategory of the subject matter) may be determined. Thus, the jurisdiction data may be analyzed to determine the compliance item that the jurisdiction data pertains too.

Based upon such a determination, the compliance timeframe may be determined in 606. In various embodiments, the jurisdiction data may indicate the compliance timeframe (e.g., when the entity needs to be within compliance to conform with requirements) and analysis of the jurisdiction data allows for such a determination (e.g., the jurisdiction data may indicate when compliance needs to be finalized). In other embodiments, the compliance category determined in 604 allows for the compliance platform to access the jurisdiction database and determine the compliance timeframe based on associated data stored within the compliance database (e.g., the stored data that is associated with the category). The determined compliance timeframe may then be appropriately stored in 608 (e.g., in the appropriate portion of the jurisdiction database).

Figure 6B:
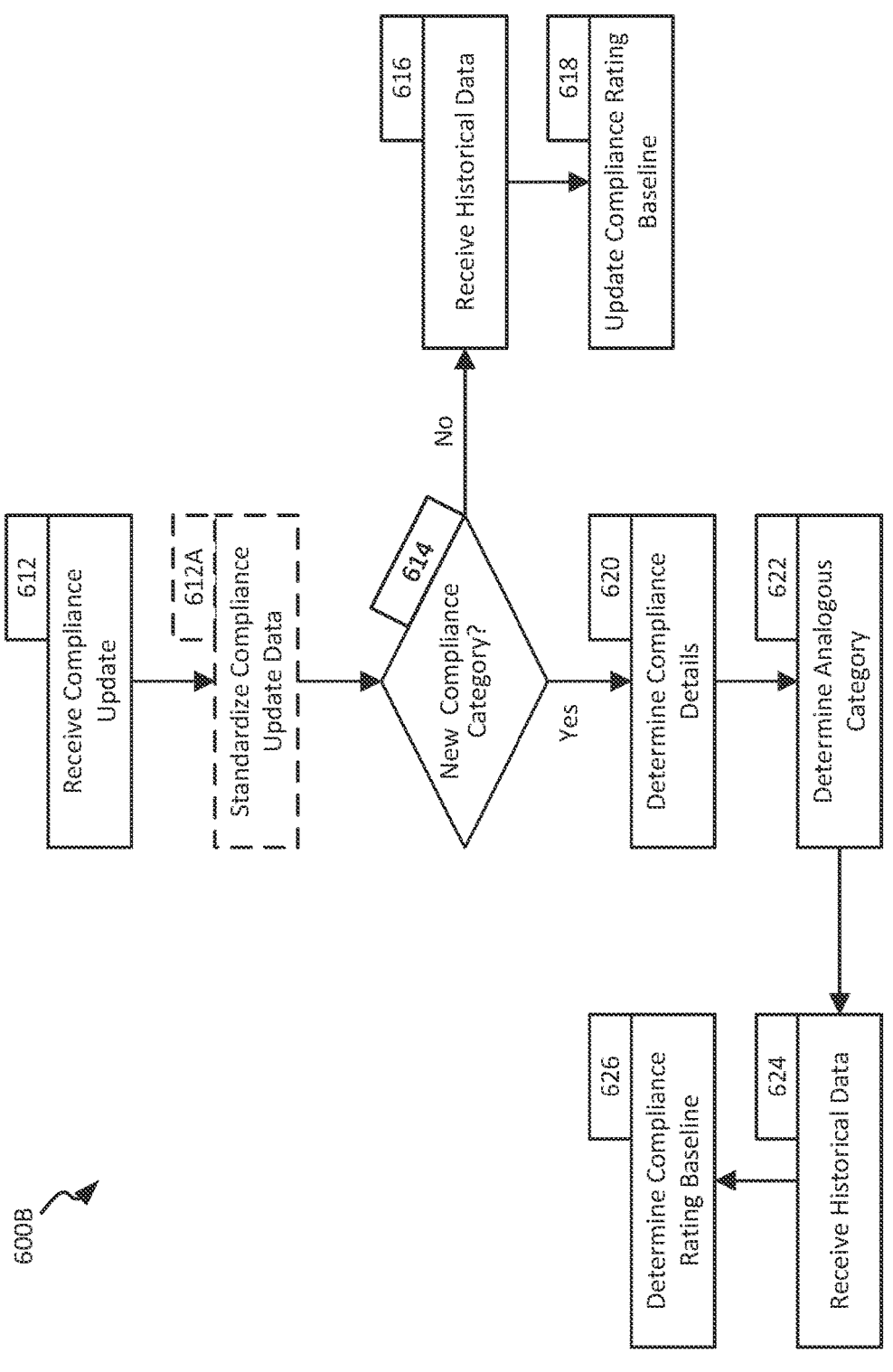

FIG. 6B illustrates technique 600B where a compliance platform determines a baseline compliance rating. In various embodiments, the compliance platform may provide a baseline score (e.g., 70 out of a 100 point rating scale, a C rating, or other such baseline score) and the compliance rating of an entity may be adjusted from baseline score depending on the compliance data associated with the entity (e.g., compliance data indicating the compliance status of the entity). In other embodiments, the baseline compliance rating may be a scale or algorithm. In such an embodiment, the baseline compliance rating may allow for the determination of the compliance rating according to the scale or algorithm and the compliance data of the entity. In certain embodiments, technique 600B may be used to determine new compliance rating baselines, while other embodiments allow for the determination of an updated compliance rating baseline based on changes to the compliance requirements (e.g., the jurisdiction may change what is needed to be in compliance).

In 612, a compliance update is received. The compliance update may be data indicating a new compliance category or updated compliance requirements for one or more compliance categories. The compliance update may, variously, include updates to the time period, reporting requirements, actions taken, personnel qualified for reporting, and/or other aspects of compliance. For certain embodiments, the data of the compliance update may be standardized in 612A.

In 614, the compliance platform may determine whether the compliance update indicates a new compliance category. In certain embodiments, the data of the compliance update received in 612 may indicate the compliance category (e.g., the data may identify the compliance category that it pertains to). The compliance platform may receive the data of the compliance update, parse the data for the portion of the data indicating the compliance category, and then access the jurisdiction database to determine whether such a compliance category associated with the jurisdiction exists within the jurisdiction (e.g., whether the jurisdiction database already includes such a compliance category for the jurisdiction). If the compliance category exists within the jurisdiction, the compliance platform may determine that the compliance update does not indicate a new compliance category and proceed to 616. Otherwise, the compliance platform may determine that the compliance update indicates a new compliance category and proceed to 620.

In 616, upon a determination that the compliance update is an update to an existing compliance category, historical data associated with the compliance category that is stored within the jurisdiction database, returns database, and/or other appropriate database is accessed. The compliance platform may determine the difference of the compliance requirements between the previously stored existing compliance category and that indicated within the data of the compliance update.

In various embodiments, the differences determined may include one or more of differences between the compliance period, the actions for being within compliance, the personnel that can perform one or more compliance actions (e.g., certain requirements may need to be reported by certain personnel, such as a compliance officer), the sequence needed for compliance (e.g., whether a first task needs to be performed before a second task can be performed), and/or other aspects of compliance.

Based on such differences, the compliance rating baseline may be updated in 618. Updating of the compliance rating may include, for example, updating the formula or algorithm to reflect changes in the compliance period (e.g., when the update shortens or lengthens a compliance period, the compliance rating baseline may be updated to reflect a lower or higher score, respectively, if a user has not yet completed the compliance task, to reflect the greater likelihood of missing or meeting the deadline, respectively), changes in the action needed to fulfill the compliance task (e.g., the compliance platform may determine if changes in the action(s) required for compliance render compliance easier or more difficult to achieve; in various embodiments, such a determination may be based upon, for example, historical data associated with the jurisdiction associated with the update and/or with another jurisdiction), changes in the personnel allowed to perform one or more compliance actions (e.g., the compliance platform may determine that the changes in personnel allowed would require another compliance personnel to fulfill the compliance tasks, and since the new compliance personnel has less responsibility, the likelihood of the task being performed is higher and, thus the compliance rating baseline may be updated to reflect a higher score reflecting the higher likelihood of compliance), the sequence needed for compliance (e.g., an updated sequence may require additional personnel to complete the compliance task and, thus, the compliance rating baseline may be updated to reflect a lower score reflecting the lower likelihood of compliance due to the higher amount of personnel; however, if all or the majority of the personnel have completed their tasks, the compliance rating baseline may reflect a higher score to reflect that the likelihood of compliance is greater and that the more complicated tasks seem to already have been completed), and/or other aspects of compliance. The updated compliance rating baseline may accordingly be stored within the respective jurisdiction database.

In various embodiments, the determination of whether certain aspects allow for compliance to easier or more difficult to achieve may be, for example, according to machine learning techniques. Thus, a machine learning module may utilize the various data stored within the compliance platform and determine the affect on compliance likelihood that results from certain changes.

In 620, upon a determination that the compliance update is a new compliance category, compliance details may be determined. Determination of the compliance details may be through analysis of the data of the compliance update, according to the techniques described herein. Based upon the compliance details determined, the compliance platform may access the jurisdiction database and one or more analogous compliance categories may be determined. Such a determination may be based upon a comparison of the requirements of the compliance update with that of the various compliance categories stored within the jurisdiction database.

In certain embodiments, compliance tasks may be categorized based upon the jurisdiction, subject matter of the task, time period for compliance, personnel required, number of steps required, and/or other aspects. The classification of the compliance tasks allows for storage within the jurisdiction database in a manner where a lookup can be performed by the compliance platform to determine similar compliance tasks. Accordingly, analogous categories may be determined.

In 624, after identification of the analogous categories in 622, historical data of the analogous categories may be received by the compliance platform from the jurisdiction database, returns database, and/or other appropriate database.

From the historical data, a compliance rating baseline may be determined in 626. In various embodiments, the compliance rating baseline of the compliance update may be determined based on the compliance rating baseline of the analogous categories. For example, each of the analogous categories may include its own compliance rating baseline and, in certain embodiments, such compliance rating baselines may be componentized (e.g., a compliance rating baseline may include three separate components that are directed to the time period for compliance, the requirements, and the personnel allowed to perfect such actions). The corresponding components of the componentized compliance rating baseline of the analogous categories may then be incorporated into the compliance rating baseline of the update. In other embodiments, the compliance rating baseline of the update may be based on the most analogous of the corresponding compliance rating baseline and modified to fit the requirements of the compliance update. The compliance rating baseline may accordingly be stored within the respective jurisdiction database.

Figure 6C:
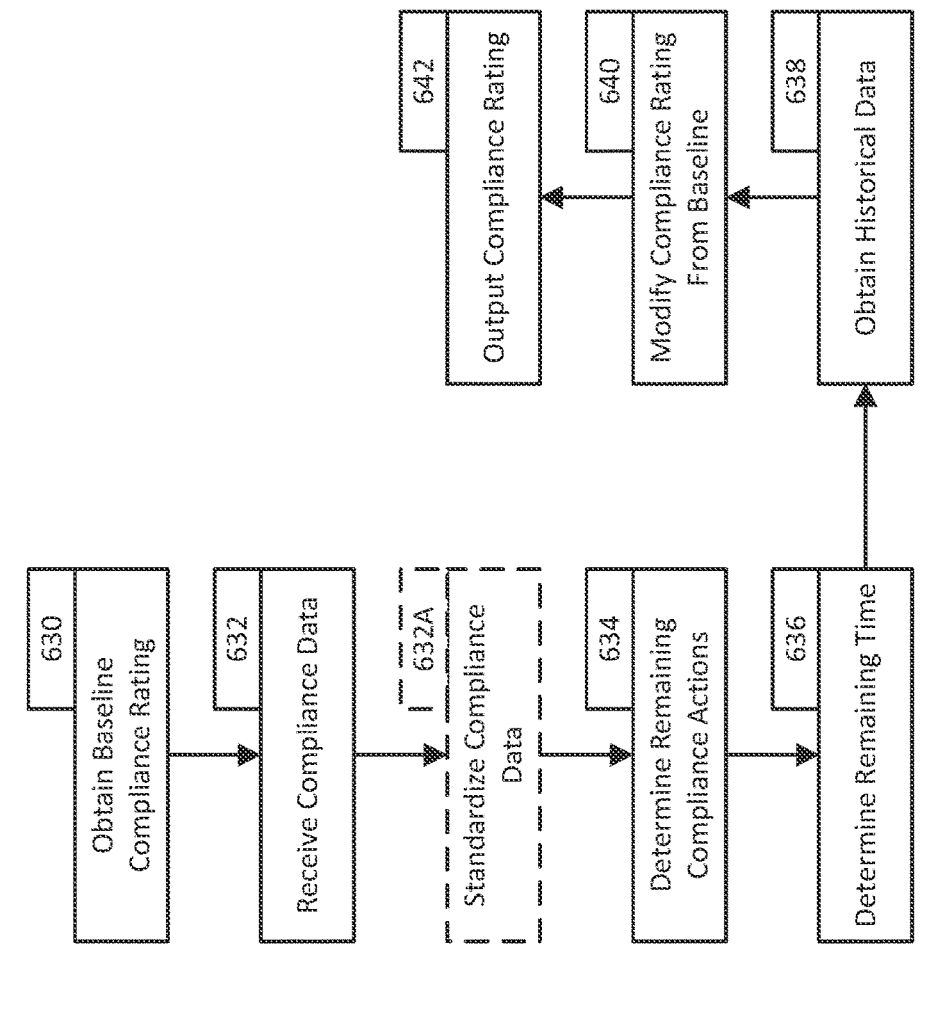

FIG. 6C illustrates technique 600C that determines a compliance rating. In 630, the baseline compliance rating is obtained from the appropriate database. The baseline compliance rating may form the base or the algorithm that allows for a determination of the compliance rating.

In 632, compliance data may be received. The compliance data may be associated with a compliance category and/or tasks thereof and may include any type of data directed to compliance, such as data indicating whether certain tasks have been completed (or not), the time of completion, the personnel reporting completion (e.g., compliance officer), the identity of the entity, the category of compliance, and/or other such data described herein. Compliance data may be communicated from a user device to the compliance platform, according to the techniques described herein. In certain embodiments, compliance data may be non-standardized data and standardization of such compliance data may be performed in 632A.

In 634, based on the compliance data, remaining compliance actions required for the compliance category and the remaining compliance period is determined. The compliance platform may determine the remaining compliance actions based on the compliance data received (e.g., the standardized compliance data), indicating which of the compliance actions have already been determined. In certain embodiments, the compliance platform may determine the remaining compliance actions based on the actions that have been completed. Additionally or alternatively, the compliance platform may track the compliance actions that have been performed or completed and automatically determine remaining compliance actions based on such tracking.

In 636, the remaining time for the compliance category to be performed is determined by the compliance platform. In various embodiments, the point in time when the actions of the compliance category needs to be completed is stored within the appropriate database. The compliance platform may accordingly determine the time remaining based on the current time. In additional embodiments, the compliance data may indicate the time remaining, the compliance entity or jurisdiction may determine and provide the time remaining to the compliance platform, and/or another technique may provide the time remaining.

In 638, historical data may be obtained from the returns database. The historical data may be historical data associated with the compliance entity. That is, the historical data may allow for a determination as to whether the compliance entity is likely to complete the tasks of the compliance category before the end of the time period for compliance. In certain embodiments, the historical data may indicate the typical time that a compliance entity requires to perform a compliance task, the portion of a typical compliance time period that the compliance entity typically performs the compliance task, the standard deviations for such data, and/or another such aspect of historical compliance by the compliance entity. In various embodiments, such data determinations may be based on, for example, machine learning.

Based on the historical data, the compliance platform modifies the compliance rating from the baseline compliance rating in 640 and/or determines the compliance rating according to the algorithm of the baseline compliance rating. The compliance rating is determined according to the historical data, the remaining compliance actions, the remaining time, and/or other such data.

The determined compliance rating is output in 642. The compliance rating may be communicated to the user device. In certain embodiments, data indicating how the entity can be more likely to become in compliance, determined according to the techniques described herein, may also be communicated.

Figure 6D:
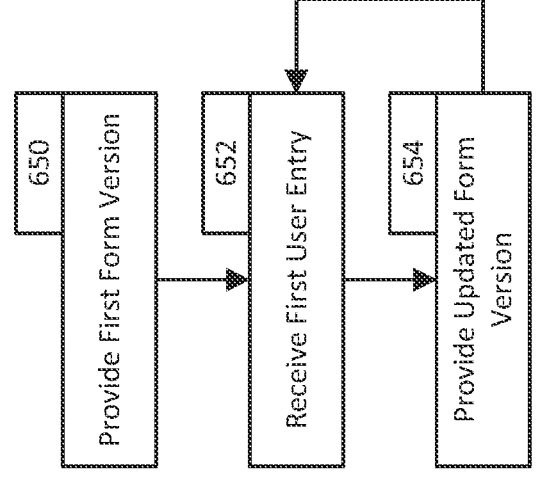

FIG. 6D illustrates technique 600D for operating a single form for a plurality of different jurisdictions and/or subject matters. Such a form may be, for example, a biopsychosocial form. Thus, the form for compliance of technique 600D may be conditionally formatted and may be updated based on answers received from the user, such as answers indicating the jurisdiction, subject matter, entities involved, and/or other aspects of the form.

In 650, data representing a first portion of the form may be provided to a user device. The data may be configured to cause a GUI of the user device to display the form. The form displayed in 650 may be a first version of the form. Such a form may, for example, be a baseline version of the form when no user entries have been provided.

In 652, user data may be received in the form displayed in the GUI of the user device. Thus, the user may provide answers to one or more portions of the form. Such inputs may be through text, audio (e.g., voice), checkbox selection, and/or another type of input style.

In 654, based on the user data entered, an updated version and/or portion of the form may be provided. In various embodiments, the form may be updated to display and/or eliminate certain questions and/or portions of a single page based on the user entry. In other embodiments, the form may provide follow up questions (e.g., in a separate page).

In certain embodiments, the user device may communicate the data received within the form to the platform. Thus, the user device may provide data indicative of the input received from the user and the platform may then provide data to update the form to the second version. Alternatively or additionally, in other embodiments, data of the entire form may be received by the user device. Accordingly, the input may be received by the form and the form may automatically update to the second form version without communicating and/or receiving additional data from the platform.

652 and 654 may be iterated until the form, based on the jurisdiction, subject matter, entities involved, and/or other aspects, is completed filled out. Thus, technique 600D may allow for a form to be continuously updated based on answers input by the user into the form of technique 600D.

Figure 7A:
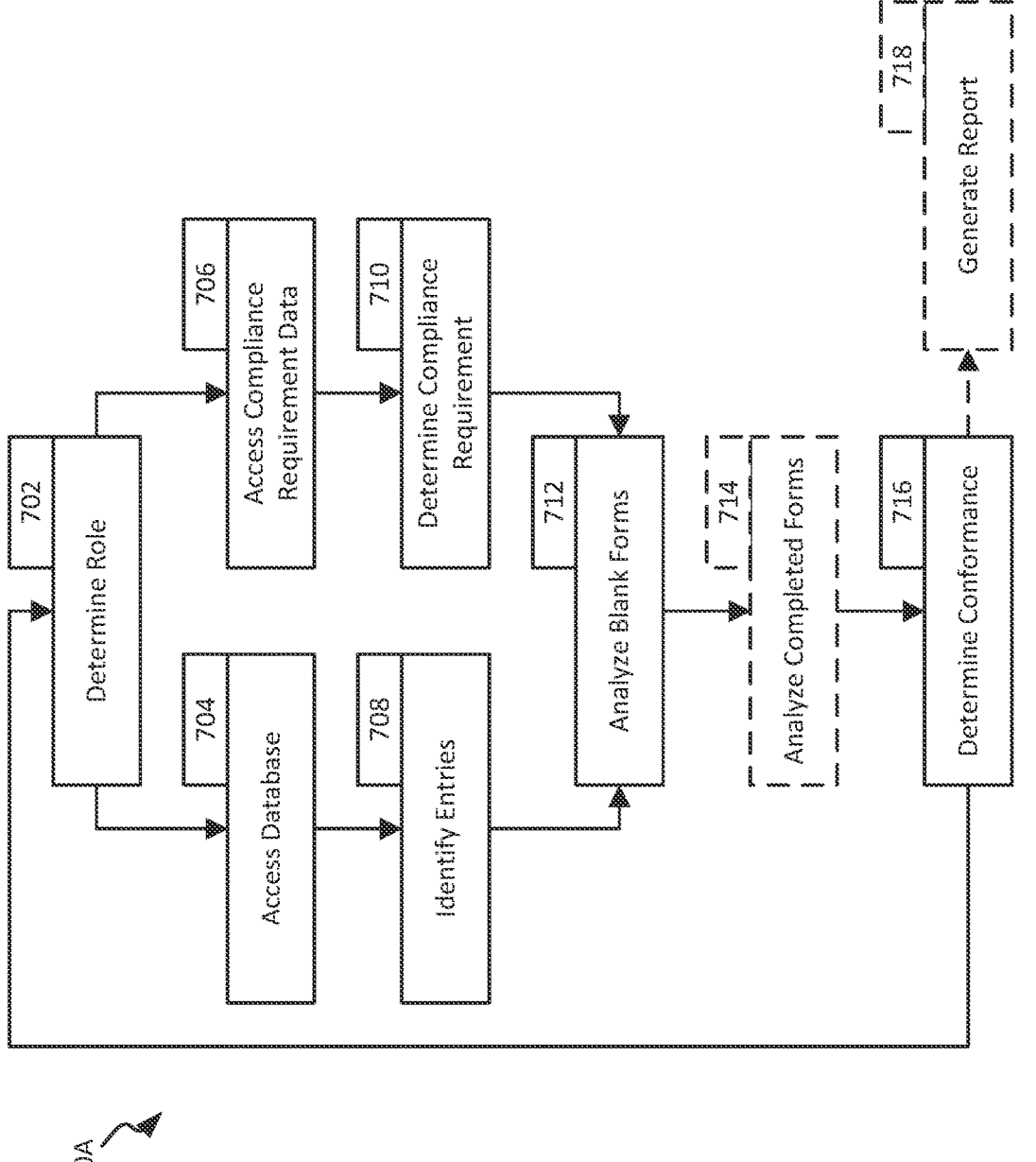
FIGS. 7A-7C are process flowcharts illustrating portions of compliance dataflow management techniques, in accordance with some embodiments.
Figure 7B:
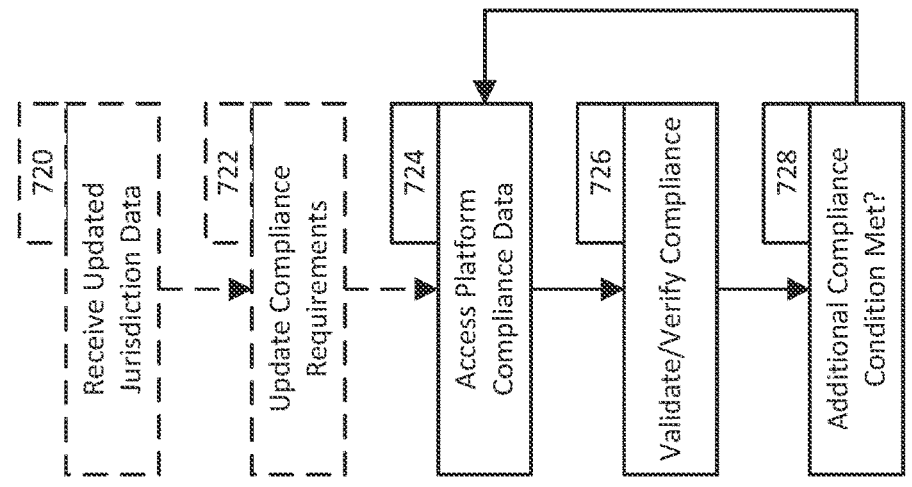
Figure 7B:
Figure 7C:
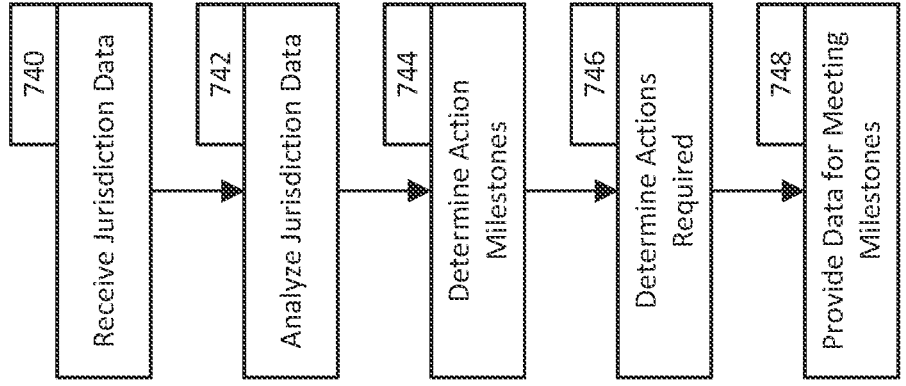

FIGS. 7A-7C are process flowcharts illustrating portions of compliance dataflow management techniques, in accordance with some embodiments. FIG. 7A illustrates technique 700A for automated auditing of the compliance platform. In various embodiments, the automated auditing may be performed by an external auditor or an auditor internal to the compliance platform (e.g., auditor 124). For such internal auditors, audits may be periodically performed (e.g., performed once every half hour, every hour, every half day, every day, every week, every month, and/or periodically performed within another such regular time period) within compliance platform to verify conformance to the regulations of various jurisdictions that an entity is associated with. Other embodiments may perform audits upon instruction or request (e.g., a user associated with the compliance entity may request that an audit be performed).

In 702, a role for the auditor may be determined. The role may indicate the permission level of the auditor and, thus, the security level of documents that the auditor is permitted to access. For example, as certain documents within the returns database may include sensitive information, the role of the auditor (e.g., the permission level) may determine whether the auditor is permitted to access such sensitive documents. In various embodiments, determining the role may also include determining the specific compliance workflow to be audited. For example, the compliance platform may include workflows for compliance with a plurality of different regulations or requirements. Determination of the compliance workflow to be audited allows for the audit to be concentrated on specific subject matter.

Based on the role and/or permission level of the auditor, the appropriate databases may be accessed for auditing in 704. Accordingly, any database such as the jurisdiction database, the form database, the workflow database, and/or the returns database may be accessed for auditing. The auditor may, thus, obtain the corresponding data from the appropriate database. Based on the permission level of the auditor, only a portion of such databases may be accessed, or all of the databases may be accessed (if permission allows). In various embodiments, at least certain returns data, form data, and/or workflow data may be accessed in 704. In certain embodiments, the auditor may first access the jurisdiction database to determine the form and/or workflow data associated with the regulations and/or requirements of a subject matter associated with a jurisdiction. The jurisdiction data may identify the appropriate form and/or workflow data and the auditor may then access the form database and the workflow database to audit such data.

In 708, based on the form data and the workflow data, the entries of a specific workflow are determined. Such specific workflows may be, for example, the compliance workflows identified in 702. Identifying the entries may include identifying the portions of the form to be filled out based on the workflow. The type of data to be provided may, accordingly, be identified.

In 706, compliance requirement data may be accessed. The compliance requirement data may be, for example, jurisdiction data indicating the type of data to be provided to be in compliance with the jurisdiction for a given compliance subject matter. Based on such data, the compliance requirement for the jurisdiction may be determined in 710. Thus, the auditor may determine the subject matter of the compliance and the jurisdiction associated with the compliance and access the jurisdiction database for the appropriate jurisdiction data associated with the subject matter of the compliance and the jurisdiction. Based on the jurisdiction data, the auditor may then determine the requirements (e.g., data requirements) for compliance within the jurisdiction.

In 712, the auditor may analyze blank forms to determine if workflows provided to users are in compliance with the regulations and/or requirements. The auditor may accordingly utilize the form data and workflow data received to determine (e.g., recreate) the workflow that is provided to users (e.g., in 708). The compliance requirements determined in 710 may then be used to analyze the blank (e.g., without filled out data) workflows that are provided for users. A determination may be made as to whether the blank workflow includes sections for filling out where, if a user where to provide the requested information, the workflow would comply with the requirements of the regulation and/or requirements of the jurisdiction.

In certain embodiments, the auditor may not be granted permission to access the appropriate form or workflow. In such a situation, the auditor is unable to determine the completed workflow as the auditor is missing at least a portion of the data needed to recreate the workflow.

Reply data from the returns database may be analyzed in optional 714. Whether the auditor is permitted to analyze the patient data may be based on, for example, the permission level of the auditor (e.g., determined in 702). As the patient data may include sensitive data, the auditor permission level may be determined to include access to such sensitive information before the auditor is allowed to analyze the patient data.

If the auditor is allowed to analyze such reply data, the auditor may, from the completed forms and/or reports of the reply data, determine whether one or more of the completed forms are in compliance with the regulations and/or requirements of the jurisdiction.

Such reports and/or completed forms may include various standardized and/or entity specific reports and/or determinations. The reports and/or determinations may be directed to compliance that may include, but are not limited to, determinations and/or reports associated with municipal, county, state, and/or federal entities, as well as reports from The Joint Commission (TJC), Commission on Accreditation of Rehabilitation Facilities (CARF), and/or other accrediting agencies as described herein.

Thus, for example, various reports and/or determinations may include risk management reports, credentialing reports, one or more required competency reports (which may include various frequencies for providing, which may be determined by one or more state, TJC, and/or internal policies), human resources documentation reports (based on frequencies determined by state, TJC, and/or internal policies), training reports (based on frequencies determined by State, TJC, and/or internal policies), Expiring License and Primary Source Verification Reports, Expiring Contracts/Agreements Reports, Expiring Continuing Education Unit (CEU) Report, and/or reports of any incomplete tasks. TJC reports may include, for example, Infection Prevention & Control Compliance Report, National Patient Safety Goal Compliance Report, Environment of Care Compliance Report, Emergency Management Compliance Report, Leadership Compliance Report, Medication Management Compliance Report, Performance Improvement Compliance Report, Waived Testing Compliance Report, and Information Management Compliance Report. CARF reports may include, for example, Leadership & Governance Compliance Report, Risk Management Report, Health and Safety Compliance Report, Performance Improvement Compliance Report, and Program Standards Compliance Report. In various other embodiments, jurisdiction database 104 and/or form database 106 may include a library of regulations and/or standards. Such regulations and/or standards may be associated with and/or determined from data directed to policies and/or supporting documentation (e.g., stored within jurisdiction database 104 and/or form database 106).

The reports may allow for the determination of whether one, some, or all of the completed forms indicate that the entity in is compliance (e.g., with the regulations and/or requirements of the jurisdiction). Such a determination may include, for example, whether the data within the finished workflow includes data provided (e.g., within the format required) for all portions of the workflow where data is required to be in compliance within the jurisdiction. The determination may additionally include a determination of whether the data provided and/or stored (e.g., the substance of the data) is in compliance with the regulations and/or requirements of the jurisdiction. As such, for example, various responses provided may be converted to standardized language (e.g., according to the techniques described herein) and the standardized language may then be analyzed to determine whether the response conforms with the rules and regulations of the jurisdiction. Certain workflow responses, such as names, may not be converted into standardized formats.

In certain embodiments, patient data may be stored as metadata requiring the workflow data and the form data to analyze (e.g., to create a completed form for auditing). In certain such embodiments, the auditor may not be granted permission to access the appropriate form or workflow. The auditor may, in error, be able to access the returns data. Nonetheless, in such a situation, the auditor is unable to determine the completed form for audit as the auditor is missing at least a portion of the data needed to recreate the workflow. Returns data is thus protected from audit despite the error.

Based on the analysis of the blank forms and/or the completed forms, conformance with the regulations and/or the requirements may be determined in 716. Non-conformance may also be determined. In certain embodiments, if conforming, data may be provided (e.g., to a user device) indicating conformance, but other embodiments may not generate any data based on a determination of conformance. In certain other embodiments, a compliance score may be determined based on the conformance and non-conformance. The compliance score may include a plurality of different components. For example, the components may include a score for the forms used and a score for the workflow used. If non-conformance is determined, data may be provided to a user device indicating non-conformance and, in certain embodiments, highlighting the areas of non-conformance. In certain embodiments, non-conformance may be fixed by the compliance platform, if solutions are determined.

In certain embodiments, the systems and techniques described herein include reports generated by, for example, compliance module 130 and/or auditor 124. Thus, in optional 718, such a report may be generated. The report may aggregate compliance data points from one or more forms, documents, surveys, reports, and/or other items (e.g., completed surveys or data available from third party sources, such as government data associated with the entity) to generate a complete report indicating compliance status across various areas of compliance. Such areas of compliance may include, but are not limited to reports from municipal, county, state, and/or federal entities, as well as reports from The Joint Commission (TJC), Commission on Accreditation of Rehabilitation Facilities (CARF), and/or other accrediting agencies as described herein. The reports may include various reports described herein.

The report may provide an overall compliance score and/or may indicate compliance of certain categories or subjects. In certain embodiments, the report may be generated based on, at least in part, the conformance determined in 716. Additionally or alternatively, various systems and/or components described herein may access the reports and other data stored and associated with the entity and the report may be generated, at least in part, based on such reports and/or other data. Thus, for example, a determination may be made from the reports and other data as to compliance and/or conformance of the entity for various subjects. The report may indicate areas of conformance and/or nonconformance as well as possible options to become compliant. In certain embodiments, the report may be variously provided to the entity, to regulating bodies, and/or to other parties (e.g., an external auditor).

In various embodiments, technique 700A may periodically repeat.

FIG. 7B illustrates technique 700B for automated compliance validation. FIG. 7B illustrates technique 700B that may determine, from data provided by a user or organization, if that user or entity is in compliance with the rules and regulations of a jurisdiction. In certain such embodiments, portions of technique 700B may be performed by, for example, an automated auditor of the platform.

In various embodiments, such auditing may be auditing of data provided by the user on an one-time, periodic, or continuous basis. Thus, for example, responses to data requests may be received by the platform as to various aspect of a user's or entity's human resources practices. Such response data may, when received, be analyzed to determine if the user and/or entity is in compliance with the relevant labor laws of a jurisdiction. Furthermore, such response data may be stored within the appropriate database. The data may be periodically analyzed (e.g., based on time elapsed since last analysis, due to changes in relevant rules and regulations, and/or based on other conditions) and determination may be made during each of these analysis as to whether the data indicates that the user and/or entity is currently in compliance. Based on the analysis, communications may be provided to the user/entity as to the compliance status.

In optional 720, jurisdiction data may be received. Such jurisdiction data may be data indicating updated rules, regulations, requirements, and/or other aspects of compliance for the subject matter within the jurisdiction. Such jurisdiction data may be similar to jurisdiction data as described herein.

In optional 722, the updated jurisdiction data received may be used to determine updated compliance requirements for the jurisdiction. The updated compliance requirements may be determined according to the techniques described herein for determining compliance requirements.

In 724, the platform's compliance data may be accessed. Such compliance data may include form data, jurisdiction data, location data, and/or other types of data as described herein. Access of such compliance data may allow for the determining of current (e.g., at the time of access) compliance requirements for the jurisdiction and/or subject matter.

In 726, compliance of the user and/or entity for the jurisdiction and/or subject matter may be validated and/or verified (e.g., based on the determined compliance requirements and the returns data). Validation of compliance may be performed on data that has just been received from the user and/or entity and/or on data of the user and/or entity that is stored within the appropriate database. As such, validation may be performed at receipt of data provided by the user, periodically (e.g., once every day, week, month, or another timeframe), and/or if certain conditions are met (e.g., if updated jurisdiction data has been received).

Variously, in 724, requirements for compliance may be established. Such requirements may, for example, include categories of data that must be received from the user, reply data that is acceptable for compliance, a timeframe where compliance is valid (e.g., such data may need to be provided within a certain timeframe, such as one month prior), and/or other such requirements. In 726, such requirements may be validated and/or verified by the platform to determine whether the user and/or entity is in compliance. As such, for example, validation/verification may include determining whether all categories or required data have been provided by the user/entity, whether the reply data received and/or stored from the user/entity is acceptable for compliance and/or indicates a type of data that is acceptable for meeting compliance (e.g., the answers to the questionnaires provided by the user indicates that the entity is in compliance such as, by providing the required yes or no answers, providing answer ranges within an acceptable range of answers, such as through numerical answers, by indicating that certain actions have been performed, and/or through other data provided), whether the reply data was provided within an acceptable timeframe (e.g., whether the data was provided has expired or not), and/or other such techniques.

In certain embodiments, if it is determined that the user/entity is out of compliance and/or about to be out of compliance (e.g., if stored data is about to expire), additional data may be communicated to the user. Such data may indicate non-compliance or imminent non-compliance of the user/entity, include a request for further data from the user/entity (whereas proper reply data would bring the user/entity back into compliance), indicate to the user/entity ways to be in compliance (e.g., the actions required and/or data to be provided in order to be back in compliance), and/or request action from the user/entity in another such manner. As such, technique 700B, upon a determination of non-compliance and/or imminent non-compliance, may provide data indicating actions and/or requirements to the user/entity that may bring the user/entity back into compliance for the subject matter and jurisdiction.

In certain embodiments, distinction may be made between data that is required for compliance versus data that is optional for compliance. For example, certain types of data may be required to be provided/stored in order for a user/entity to be in compliance. Additionally, such types of data may need to be of a certain nature (e.g., answered in a certain manner or within a certain threshold) in order for the user/entity to be in compliance. Other types of data may be optional and may not be required for compliance (e.g., in certain embodiments, providing of such data may result in a requirement that such data may need to be in a certain range in order to be in compliance). The platform may distinguish between data that is required and data that is optional in the validation/verification. In various embodiments, certain platforms may only analyze required data, while other embodiments may analyze both required and optional data. Feedback provided to the user/entity may also only concern required data in certain embodiments (e.g., the feedback may only highlight data that is required for compliance), but may concern both required and optional data in other embodiments (e.g., the feedback may indicate that certain optional data is missing, but that such data is optional).

In 728, the compliance platform may determine whether additional compliance condition has been met to, for example, determine if the user/entity is still in compliance. As such, the additional compliance condition triggers a further round of validation/verification of the compliance of the user/entity. Such a technique may include, for example, a determination of whether time elapsed indicates that an additional round of validation/verification is required, that updated jurisdiction data indicates that an additional round of validation/verification is required, that an additional round of validation/verification has been ordered (e.g., by the user), and/or that another such condition has been met. If such a condition is met, the technique may return to 724 and perform such a validation technique. Thus, it is appreciated that, in various embodiments, some or all of technique 700B (e.g., 724 to 728) may be periodically performed.

FIG. 7C illustrates technique 700C for automated compliance milestone determination. Such milestones of technique 700C may include, for example, milestones where user/entity action is required. In certain such embodiments, such milestones may be milestones to keep a user/entity in compliance with the rules, regulations, and/or requirements of a jurisdiction. Thus, for example, certain jurisdictions may require yearly fire drills, and technique 700C may aid in a user/entity in performing such fire drills.

In 740, jurisdiction data may be received. The jurisdiction data may be as described herein. The jurisdiction data may be analyzed in 742, according to the techniques described herein. Based on the analysis of the jurisdiction data in 742, a determination may be made in 744 that one or more action milestones are upcoming. Thus, for example, analysis of the jurisdiction data may determine the requirement for a yearly fire drill for each office, bi-yearly sexual harassment training for every employee, and/or every 3 year continuing education training for each professionally licensed employee.

Based on the determination of action milestones in 744, returns data from the returns database may be accessed and a determination made as to the actions required to be in compliance, in 746. Data associated with such actions may be accordingly provided in 748.

Such actions may be based on returns data stored within a returns database. Thus, for example, if returns data indicates that an office just performed a fire drill a week ago, no action may be required. However, if a determination is made that it has been 50 weeks since a fire drill has been performed, a reminder may be generated and provided to the user/entity. If a determination is made that the office is overdue for a fire drill, an urgent reminder may be generated and provided to the user/entity. In certain embodiments, such communications may be scheduled for the future (if there is still time remaining for compliance) or may be provided as soon as possible. In various embodiments, where the action may pertain to only certain members (e.g., employees) of an entity (e.g., based on their role and/or based on data indicating that they are not currently in compliance), such data may identify the members of the organization for which such actions are required.

Figure 8:
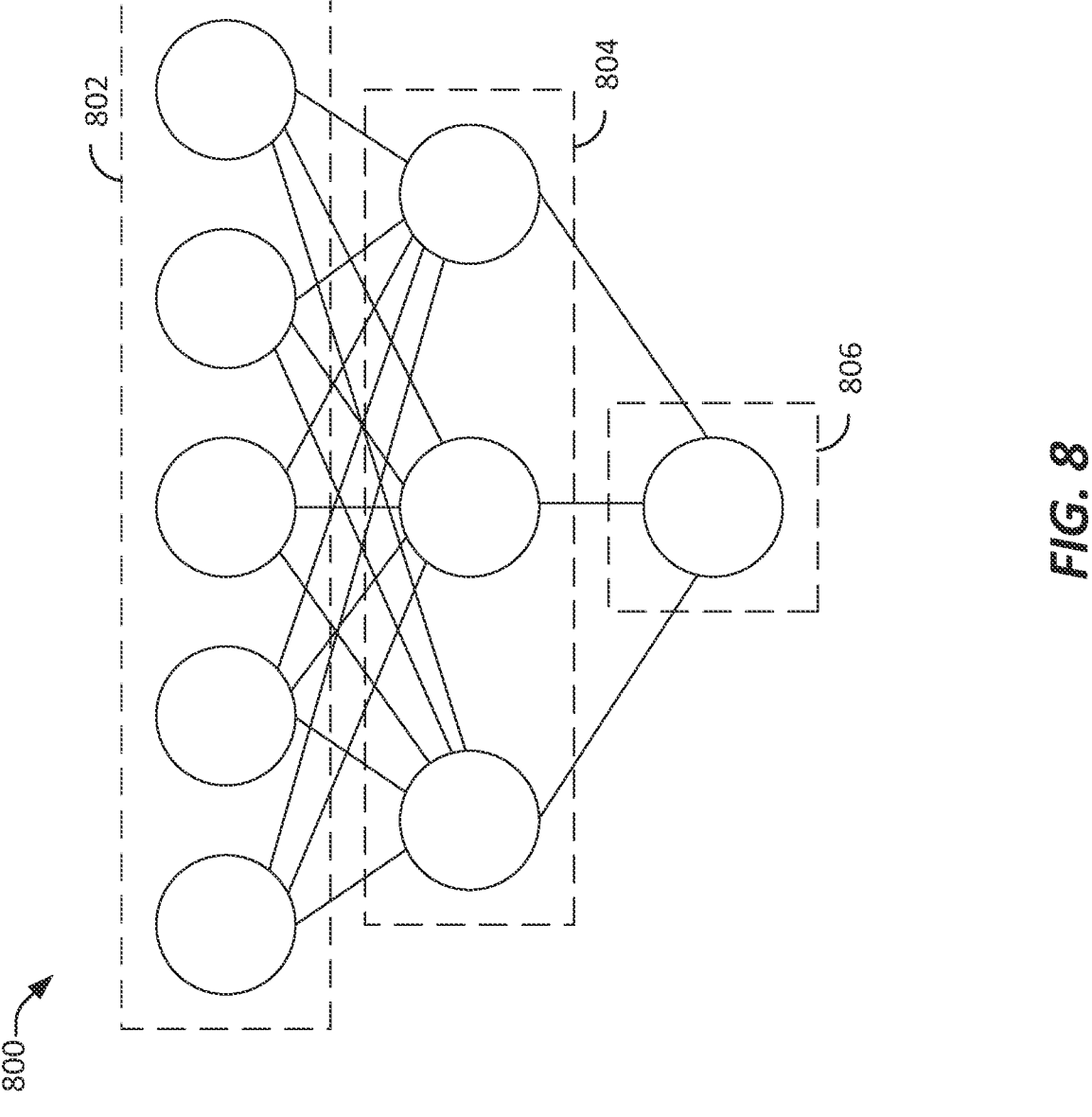
FIG. 8 illustrates an example of a neural network, configured in accordance with some embodiments.

FIG. 8 illustrates an example of a neural network, configured in accordance with some embodiments. FIG. 8 illustrates a neural network 800 that includes input layer 802, hidden layers 804, and output layer 806. Neural network 800 may be a machine learning network that may be trained to perform the techniques described herein (e.g., determining a predicted location of a user and/or providing location groups for the user).

Neural network 800 may be trained with inputs. Input layer 802 may include such inputs. Such inputs may include, for example, regulations, requirements, forms (e.g., example blank or filled out forms), regulation interpretations (e.g., Westlaw® commentary), returns data, completed compliance replies, and/or other such data described herein. Hidden layers 804 may be one or more intermediate layers where logic is performed to determine various aspects of the data (e.g., conversion of a plurality of regulations utilizing different vocabulary to standardized vocabulary). Output layer 806 may result from computation performed within hidden layers 804 and may output, for example, forms, workflows, regulation and requirement interpretations, audit results, and/or other such outputs.

Machine learning may be utilized to determine parameters of the techniques described herein and/or to perform the techniques themselves. In various embodiments, machine learning may continuously or periodically refine the determinations based on data received (e.g., additional jurisdiction data received).

Figure 9A:
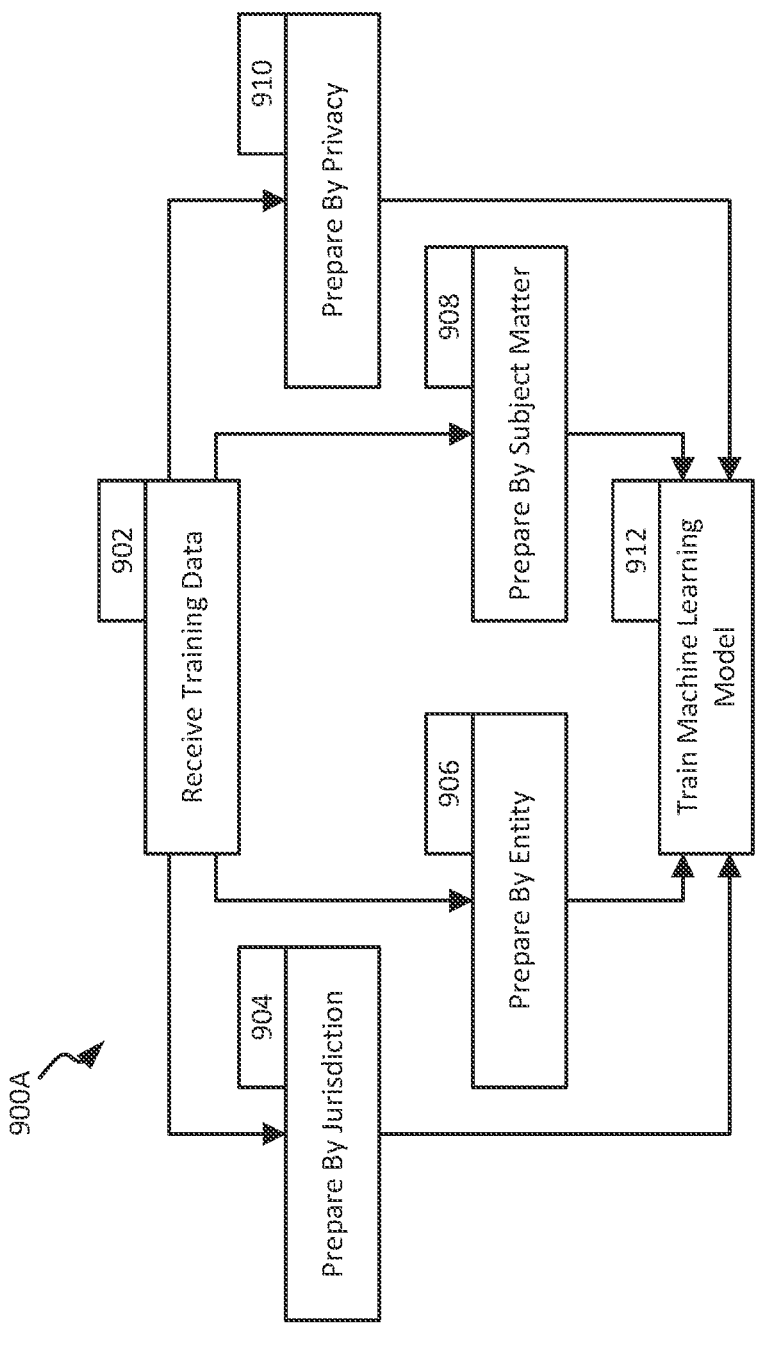
FIGS. 9A and 9B illustrate machine learning training techniques for compliance rating determination, in accordance with some embodiments.
Figure 9B:
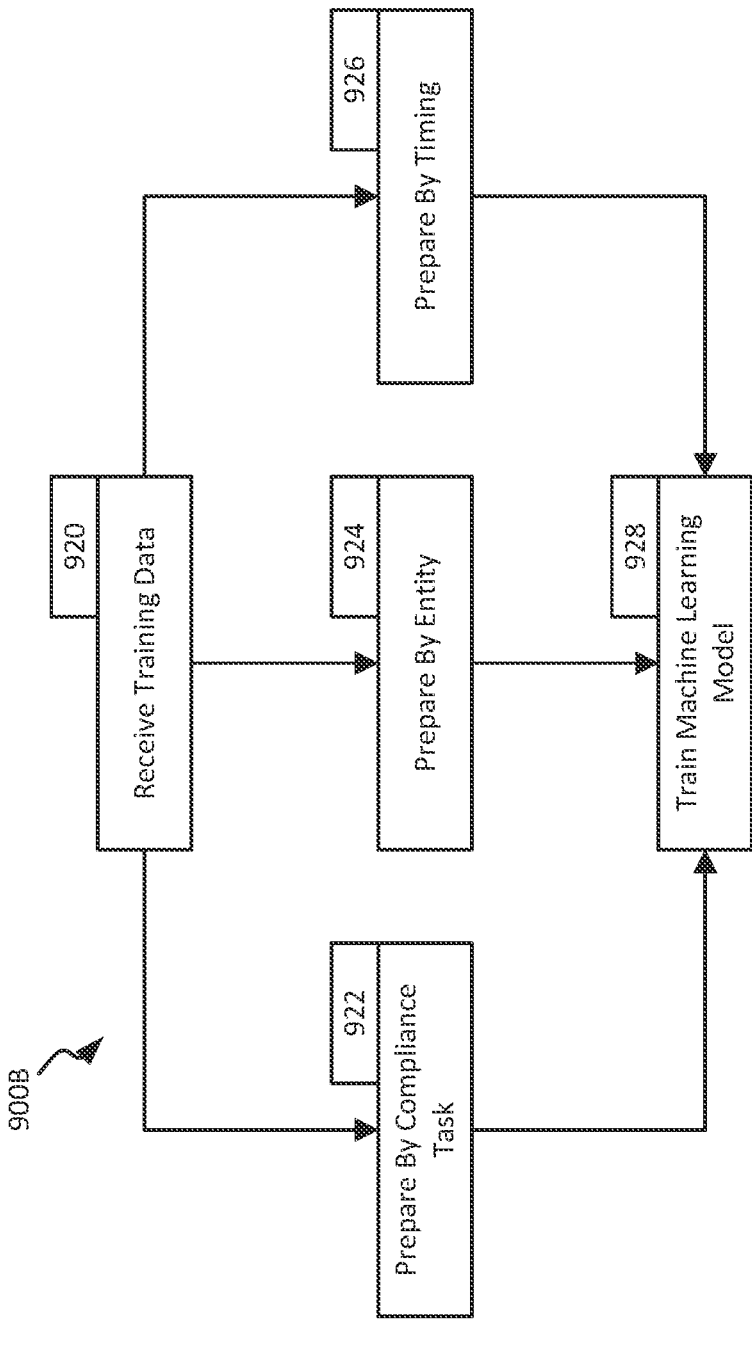

FIGS. 9A and 9B illustrate machine learning training techniques for compliance rating determination, in accordance with some embodiments. FIG. 9A illustrates technique 900A for training a machine learning model to perform techniques described herein.

In 902, training data may be received. The training data may be data specifically prepared for training the machine learning model and/or may be real data used for training the machine learning model. In certain embodiments that utilize real data, the data may be sanitized (e.g., sensitive information may be removed), before the data is then utilized to train the machine learning model.

The training data may then be prepared in a plurality of different manners. Preparing the training data in a plurality of different manners may include preparing multiple copies of the training data, each of which may then be prepared according to the different manners. In various embodiments, the training data may include a plurality of datapoints. Each datapoint may be, for example, a blank or completed compliance request and may include a plurality of elements. Such a plurality of elements may include elements providing information associated with one or more of a jurisdiction (e.g., indication of the area that care was provided), a compliance entity (e.g., entity requesting compliance), a subject matter (e.g., the type of care provided), privacy level (e.g., sensitivity of data), and/or other such element. Such elements may be utilized for preparation of training data.

In 904, the training data may be prepared based on jurisdiction. In various embodiments, the various portions of the training data may indicate associated jurisdictions. Thus, for example, the training data may include the actual language of regulations and/or requirements as well as commentary and/or standardized language interpretations of the regulations and/or requirements. Each regulation and/or requirement may be associated with one or more jurisdictions. Preparing the training data by jurisdiction may, for example, allow for the machine learning model to determine trends within languages in jurisdictions and/or patterns in requirements within jurisdictions.

In 906, the training data may be prepared based on entity. In various embodiments, the entity may be, for example, the entity requesting the compliance action and/or providing the requested data. Thus, for example, the compliance entity may be a health insurance provider, a healthcare services provider, a billing entity, a private practitioner, an employee, a service receiver, a human resources employee, and/or another such person or entity. Each portion of the training data may be associated with one or more such entities. For example, in various embodiments, the training data may include filled out forms and each form of the training data may be associated with the compliance entity that filled out the form. In another embodiment, certain regulations or requirements may be associated with certain parties or categories of parties (e.g., insurance providers) and the training data may be prepared accordingly. Preparing the training data by the identity of the entity may, for example, allow for the machine learning model to determine trends in how different compliance entities provide information, allowing for responses between compliance entities to be standardized.

In 908, the training data may be prepared according to subject matter. For example, the various portions of the training data may be prepared according to categories (e.g., the category of the forms) such as insurance claim, post-procedure report, human resources summary, and/or other such categories for forms and data that are associated with regulations and/or requirements. Preparing the training data by subject matter may, for example, allow for the machine learning model to determine typical data that is required for each subject matter, how entities generally respond to forms and/or questions for each subject matter to comply with regulations and/or requirements, the number and types of forms that are generally required for each subject matter, and/or other aspects.

In 910, the training data may be prepared according to privacy level. For example, various data may each be accorded a privacy level depending on their sensitivity (e.g., certain data, such as location of procedure, may not be very sensitive, while other data, such as identification number, may be very sensitive). Based on the privacy level, the machine learning model may be trained to only provide certain information and/or only access certain forms (which may require such information from a user), and/or limit other such actions.

Based on the training data prepared in 904, 906, 908, and 910, the machine learning model may be trained in 912. Training of the machine learning model may include, for example, training the machine learning model to interpret updates to the regulation (e.g., to receive data of updated regulations and determine updates to the forms and/or the workflow due to the regulations, as well as the categorization, such as jurisdiction, of the updated regulations), to determine whether a workflow or a form (blank or filled) is in compliance, to perform audits, and/or perform other such actions.

FIG. 9B illustrates technique 900B for training a machine learning model to perform determine a compliance rating, according to the techniques described herein. In 920, training data may be received. The training data may be data specifically prepared for training the machine learning model and/or may be real data used for training the machine learning model. In certain embodiments that utilize real data, the data may be sanitized (e.g., sensitive information may be removed), before the data is then utilized to train the machine learning model.

The training data may then be prepared in a plurality of different manners, as described herein (e.g., in FIG. 9A). In 922, the training data may be prepared based on compliance task. Preparation based on compliance task may include preparation of the data based on the category of the task, the specific actions required, the likelihood of compliance, the timing of compliance of the various tasks and/or the compliance category itself, and/or other such aspects. Preparing the training data by the compliance task may, for example, allow for the machine learning model to determine trends in how compliance tasks may be fulfilled, how the performance of one tasks affects other tasks (e.g., how the performance of one task may affect the likelihood of other tasks being performed and/or of an organization being in compliance at the end of a compliance period), the time and/or resources typically required to fulfill compliance tasks, and/or other such determinations.

In 924, the training data may be prepared based on entity, according to the techniques described herein. Preparing the training data by the identity of the entity may, for example, allow for the machine learning model to determine trends in how different compliance entities provide information, allowing for responses between compliance entities to be standardized. Such trends may include, for example, the typical workflow that a certain entity goes through to be in compliance (e.g., how long it takes for the entity to complete certain tasks, the sequence that the entity completes tasks in, whether additional steps such as approval or preparation is necessary to complete certain tasks, and/or other such workflow considerations), the amount of resources provided to fulfilling compliance (e.g., certain organizations may include more personnel devoted to compliance than others and additional personnel may allow for more flexibility for an organization to rapidly perform compliance activities), the speed that various members of an entity requires to complete tasks (e.g., compliance activities may be performed by a plurality of different people and the different people may typically perform tasks at different speeds), an organization's ability to crunch to fulfill compliance (e.g., to determine whether, for a given amount of time remaining in a compliance period, an organization is able to become in compliance), and/or other such insights.

In 926, the training data may be prepared based on timing (e.g., timing of the performance of the compliance tasks and/or timing required by the compliance entity to perform compliance tasks and/or compliance categories). In certain embodiments, preparation based on the entity may include training data associated with the timing of compliance of the entity, such as the timing (e.g., time needed or time during a compliance period when a task is completed) of the actions performed by the entity. Preparing the training data by timing may, for example, allow for the machine learning model to determine the amount of time, the typical timing, and/or other aspects in how compliance tasks are performed. In various situations, compliance tasks and/or categories may not be performed instantly and instead requires an amount of time to perform. Additionally or alternatively, a compliance entity may include a typical timing cadence in how various compliance tasks are performed. The compliance platform may be configured to determine such timing aspects and incorporate them within the compliance rating determination. The machine learning model may be accordingly trained to determine such timing aspects.

Based on the training data prepared in 922, 924, and 928, the machine learning model may be trained in 928. Training of the machine learning model may include, for example, parsing compliance data received to determine a compliance rating. The compliance rating may indicate the likelihood that a compliance entity is able to be in compliance by the end of the compliance period. In certain embodiments, the machine learning model may additionally be trained to determine what is needed for a compliance entity to increase the chances that it is able to be in compliance by the end of the compliance period.

Figure 10:
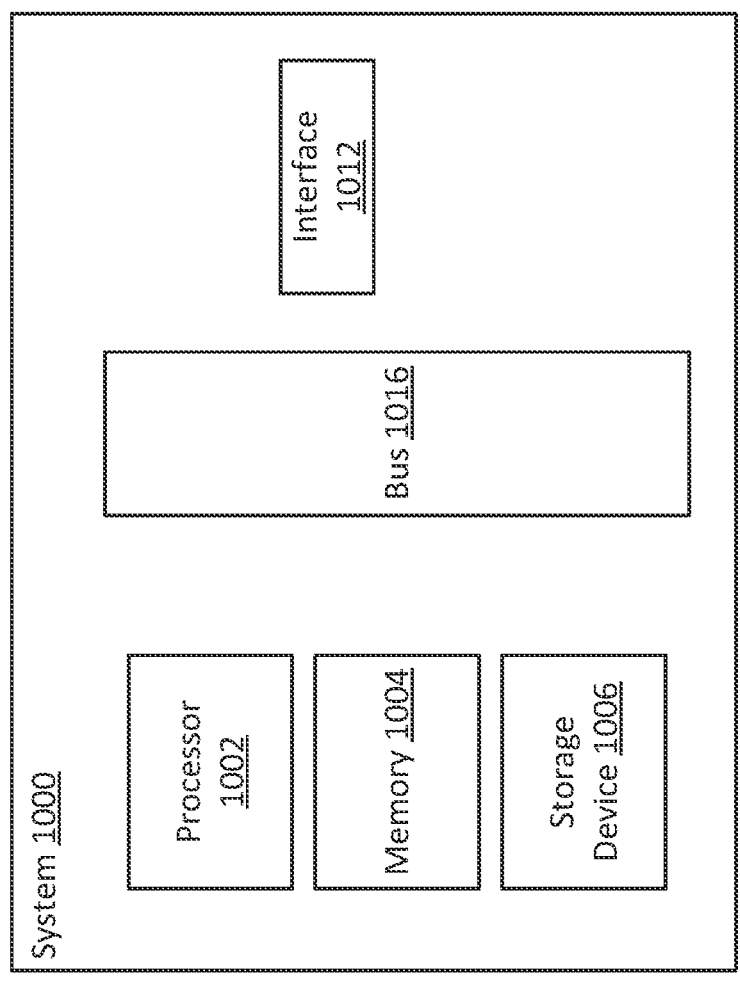
FIG. 10 illustrates a block diagram of an example computing system, in accordance with some embodiments.

FIG. 10 illustrates a block diagram of an example computing system, in accordance with some embodiments. According to various embodiments, a system 1000 suitable for implementing embodiments described herein includes a processor 1002, a memory module 1004, a storage device 1006, an interface 1012, and a bus 1016 (e.g., a PCI bus or other interconnection fabric.) System 1000 may operate as variety of devices such as a server system such as an application server and a database server, a client system such as a laptop, desktop, smartphone, tablet, wearable device, set top box, etc., or any other device or service described herein.

Although a particular configuration is described, a variety of alternative configurations are possible. The processor 1002 may perform operations such as those described herein. Instructions for performing such operations may be embodied in the memory 1004, on one or more non-transitory computer readable media, or on some other storage device. Various specially configured devices can also be used in place of or in addition to the processor 1002. The interface 1012 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 11:
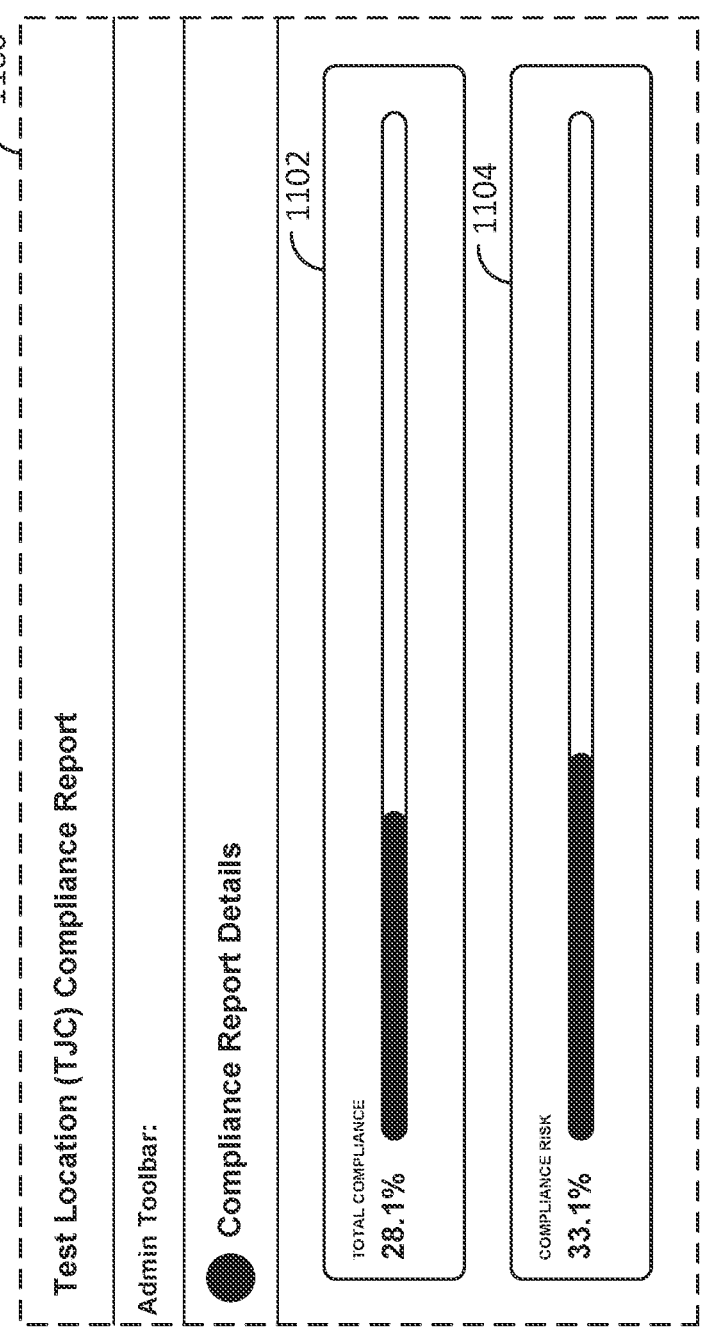
FIG. 11 illustrates a graphical user interface, in accordance with some embodiments.

FIG. 11 illustrates a graphical user interface, in accordance with some embodiments. FIG. 11 illustrates GUI 1100. GUI 1100 may be configured to communicate compliance with the requirements of a jurisdiction, according to the techniques described herein, and may include current compliance score 1102 and compliance risk score 1104. GUI 1100 may be a GUI configured to display both the current compliance score (e.g., the compliance of the entity to that of the requirements of the jurisdiction at the moment) as well as the risk score (e.g., the likelihood that the entity will be in compliance or not be in compliance with the requirements of the jurisdiction) of the entity, according to the techniques described herein. Current compliance score 1102 may be, for example, a spot check score while compliance risk score 1104 may be a risk score.

Any of the disclosed embodiments may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various embodiments have been described herein, it should be understood that they have been presented by way of example only, and not limitation. For example, some techniques and mechanisms are described herein in the context of fulfillment. However, the disclosed techniques apply to a wide variety of circumstances. Particular embodiments may be implemented without some or all of the specific details described herein. In other instances, well known process operations have not been described in detail in order not to unnecessarily obscure the techniques disclosed herein. Accordingly, the breadth and scope of the present application should not be limited by any of the embodiments described herein, but should be defined only in accordance with the claims and their equivalents.

The invention claimed is:

1. A system comprising:

a jurisdiction database;

an audit database;

a communication module, comprising an interface comprising a port configured to send and receive data packets with one or more external devices; and a controller, comprising a processor and a non-transitory memory, the controller communicatively coupled to the jurisdiction database, the audit database, and the communication module, the non-transitory memory comprising instructions configured to cause the processor to control the system to perform operations comprising:

receiving, via the communication module, compliance data associated with a first audit from a first user device, the compliance data including geographical data;

determining, from the geographical data, a first jurisdiction associated with the first audit;

obtaining jurisdiction requirement data associated with the first jurisdiction from the jurisdiction database;

determining, from the jurisdiction requirement data, audit requirements of the first audit;

determining, from the jurisdiction requirement data and the compliance data, a remaining audit period;

determining a compliance rating based on the compliance data, the audit requirements, and the remaining audit period, wherein the compliance rating is configured to indicate a likelihood of compliance by the end of the remaining audit period; and outputting the compliance rating.

2. The system of claim 1, wherein the operations further comprise:

obtaining first user historical data from the audit database, wherein the compliance rating is further determined based on the first user historical data.

3. The system of claim 2, wherein the operations further comprise:

determining, based on the first user historical data, a historical compliance pattern.

4. The system of claim 3, wherein the operations further comprise:

determining a difference between the compliance data and the historical compliance pattern.

5. The system of claim 1, wherein the operations further comprise:

determining that the compliance rating is below a threshold compliance rating.

6. The system of claim 5, wherein the operations further comprise:

determining suggested compliance actions; and outputting the suggested compliance actions to the first user device.

7. The system of claim 1, wherein the compliance data comprises action data, wherein the action data indicates one or more compliance actions and an associated time of action for each of the compliance actions, and wherein the compliance rating is determined based on the action data.

8. The system of claim 1, wherein the compliance rating is output to the first user device.

9. The system of claim 1, wherein the compliance rating is output to a third party auditor.

10. A method comprising:

receiving, via a communication module, compliance data associated with a first audit from a first user device, the compliance data including geographical data;

determining, from the geographical data, a first jurisdiction associated with the first audit;

obtaining jurisdiction requirement data associated with the first jurisdiction from a jurisdiction database;

determining, from the jurisdiction requirement data, audit requirements of the first audit;

determining, from the jurisdiction requirement data and the compliance data, a remaining audit period;

determining a compliance rating based on the compliance data, the audit requirements, and the remaining audit period, wherein the compliance rating is configured to indicate a likelihood of compliance by the end of the remaining audit period; and outputting the compliance rating.

11. The method of claim 10, further comprising:

obtaining first user historical data from an audit database, wherein the compliance rating is further determined based on the first user historical data.

12. The method of claim 11, further comprising:

determining, based on the first user historical data, a historical compliance pattern.

13. The method of claim 12, further comprising:

determining a difference between the compliance data and the historical compliance pattern.

14. The method of claim 10, further comprising:

determining that the compliance rating is below a threshold compliance rating.

15. The method of claim 14, further comprising:

determining suggested compliance actions; and outputting the suggested compliance actions to the first user device.

16. The method of claim 10, wherein the compliance data comprises action data, wherein the action data indicates one or more compliance actions and an associated time of action for each of the compliance actions, and wherein the compliance rating is determined based on the action data.

17. The method of claim 10, wherein the compliance rating is output to the first user device.

18. The method of claim 10, wherein the compliance rating is output to a third party auditor.

19. The system of claim 5, wherein the outputting the compliance rating is based on the determining that the compliance rating is below the threshold compliance rating.

20. The method of claim 14, wherein the outputting the compliance rating is based on the determining that the compliance rating is below the threshold compliance rating.

\* \* \* \* \*